United States Patent
Oosumi et al.

(10) Patent No.: US 10,305,327 B2
(45) Date of Patent: *May 28, 2019

(54) POWER TRANSMITTING DEVICE AND WIRELESS POWER TRANSMISSION SYSTEM

(71) Applicant: PANASONIC INTELLECTUAL PROPERTY MANAGEMENT CO., LTD., Osaka (JP)

(72) Inventors: Hideo Oosumi, Osaka (JP); Hiroshi Kanno, Osaka (JP); Hiroshi Yamamoto, Osaka (JP); Tsutomu Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 82 days.

This patent is subject to a terminal disclaimer.

(21) Appl. No.: 15/670,371

(22) Filed: Aug. 7, 2017

(65) Prior Publication Data
US 2017/0338694 A1    Nov. 23, 2017

Related U.S. Application Data

(63) Continuation of application No. 14/716,906, filed on May 20, 2015, now Pat. No. 9,762,091.

(30) Foreign Application Priority Data

May 26, 2014  (JP) .................................. 2014-108207
Feb. 20, 2015  (JP) .................................. 2015-031451

(51) Int. Cl.
   *H02J 7/02*    (2016.01)
   *H02J 50/10*   (2016.01)
   (Continued)

(52) U.S. Cl.
CPC .............. *H02J 50/10* (2016.02); *H02J 7/025* (2013.01); *H02J 50/12* (2016.02); *H02J 50/60* (2016.02); *H02J 50/80* (2016.02); *H02J 50/90* (2016.02)

(58) Field of Classification Search
CPC .. H02J 17/00; H02J 50/10; H02J 50/80; H02J 7/025; H02J 50/12; H02J 50/60; H02J 50/90
See application file for complete search history.

(56) References Cited

U.S. PATENT DOCUMENTS 9,509,375 B2    11/2016  Park et al.
9,548,674 B2     1/2017  Murai et al.
(Continued)

FOREIGN PATENT DOCUMENTS

JP    2012-196026       10/2012
JP    2014-023328        2/2014
JP    2014-075934 A      4/2014

OTHER PUBLICATIONS

The Extended European Search Report, dated Sep. 2, 2015 from the European Patent Office (EPO), for the related European Patent Application No. 15169164.9.
System Description, Wireless Power Transfer, vol. I: Low Power, Part 1 : Interface Definition, Qi specification, Wireless Power Consortium, Jul. 31, 2012.

*Primary Examiner* — Jared Fureman
*Assistant Examiner* — Duc M Pham
(74) *Attorney, Agent, or Firm* — Greenblum & Bernstein, P.L.C.

(57)    ABSTRACT

A control method for a power transmitting device is provided, the power transmitting device including a power transmitting antenna, which transmits AC power wirelessly to the power receiving antenna of a power receiving device, and an oscillator. The method includes supplying pulse
(Continued)

signals that control first and second switching element groups to the oscillator, and changing a phase shift amount between a first pulse signal and a second pulse signal. The method also includes causing the oscillator to change the voltage of the AC power output and to set an initial value of the phase shift amount. The method further includes causing the oscillator to output preliminary AC power of a voltage to reduce the phase shift amount from the initial value, fixing the phase shift amount, and causing the oscillator to output the AC power while maintaining the voltage corresponding to the fixed phase shift amount.

9 Claims, 15 Drawing Sheets

(51) Int. Cl.
*H02J 50/12* (2016.01)
*H02J 50/60* (2016.01)
*H02J 50/80* (2016.01)
*H02J 50/90* (2016.01)

(56) References Cited

U.S. PATENT DOCUMENTS

| | | |
|---|---|---|
| 9,762,091 B2 * | 9/2017 | Oosumi ................. H02J 17/00 |
| 2010/0225173 A1 | 9/2010 | Aoyama et al. |
| 2012/0086281 A1 | 4/2012 | Kanno |
| 2013/0334896 A1 | 12/2013 | Yamamoto |
| 2014/0375139 A1 | 12/2014 | Tsukamoto |
| 2016/0064951 A1 | 3/2016 | Yamamoto et al. |

* cited by examiner

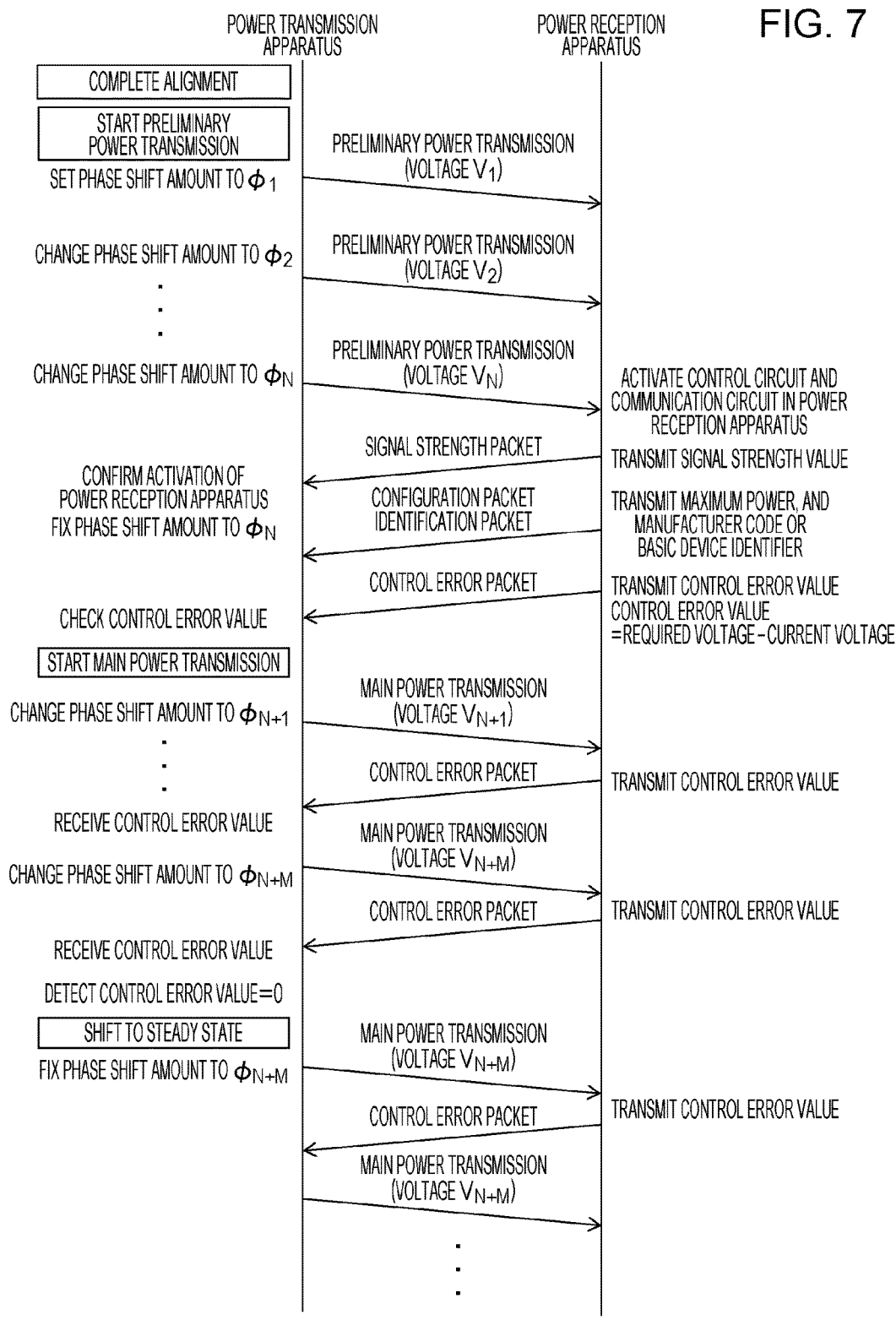

FIG. 8

| HEADER | MESSAGE | CHECKSUM |

◇ HEADER (PACKET TYPE)
   TYPE INFORMATION SUCH AS
   SIGNAL STRENGTH PACKET
   CONFIGURATION PACKET
   IDENTIFICATION PACKET
   CONTROL ERROR PACKET

◇ MESSAGE (PACKET INFORMATION)
   · SIGNAL STRENGTH PACKET INCLUDING
     SIGNAL STRENGTH VALUE OR OTHERS

· CONFIGURATION PACKET INCLUDING
     MAXIMUM POWER OR OTHERS

· IDENTIFICATION PACKET INCLUDING
     MANUFACTURER CODE
     BASIC DEVICE IDENTIFIER, OR OTHERS

· CONTROL ERROR PACKET INCLUDING
     CONTROL ERROR VALUE

◇ CHECKSUM
   ERROR DETECTION CODE

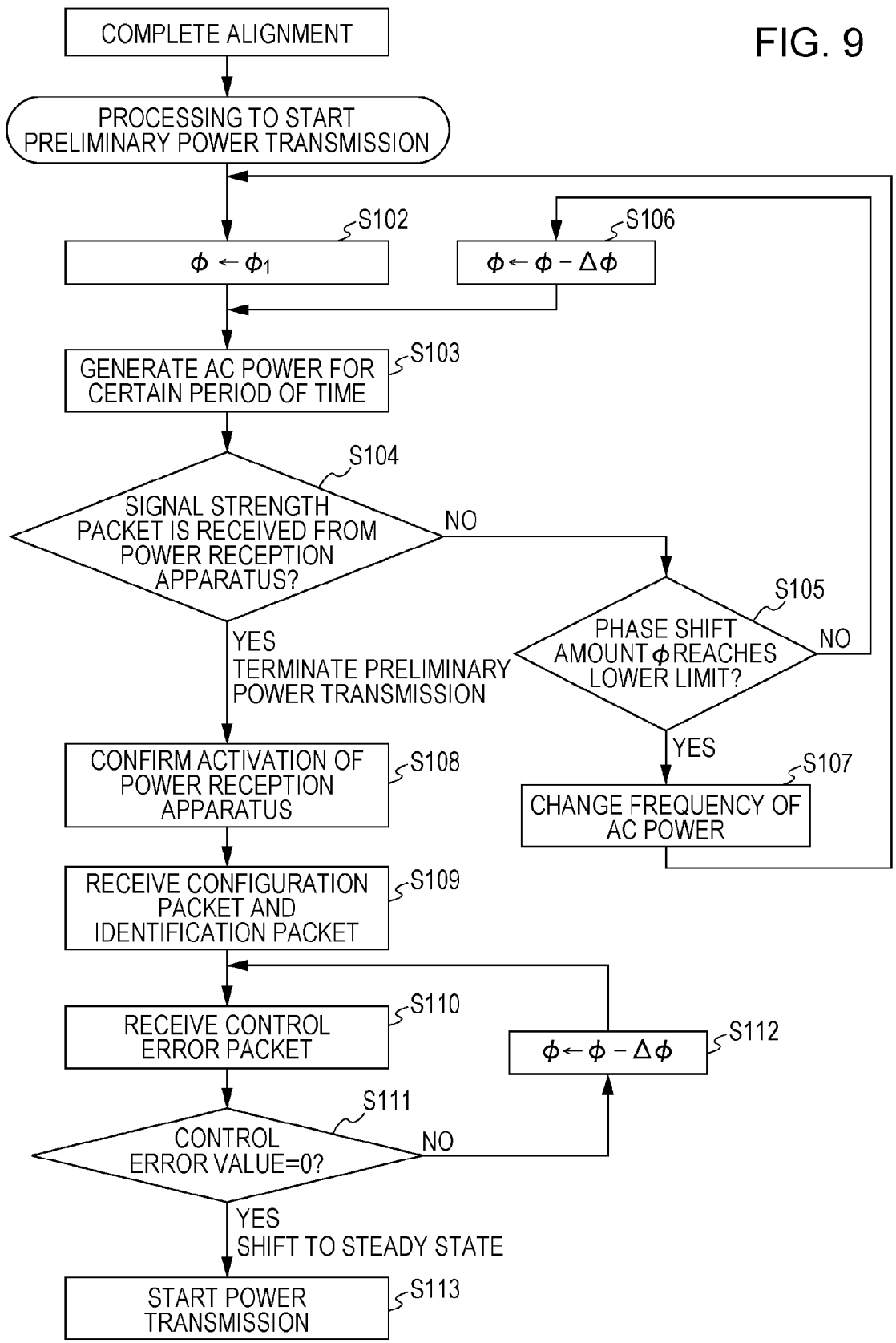

POWER TRANSMITTING DEVICE AND WIRELESS POWER TRANSMISSION SYSTEM

CROSS-REFERENCE TO RELATED APPLICATIONS

This is a continuation of U.S. application Ser. No. 14/716,906 filed May 20, 2015, which claims the benefit of Japanese Patent Application No. 2015-031451, filed Feb. 20, 2015 and 2014-108207, filed May 26, 2014. The disclosure of each of the above-identified applications, including the specification, drawings and claims, is incorporated herein by reference in its entirety.

TECHNICAL FIELD

The present disclosure relates to a power transmitting apparatus and a wireless power transmission system for transmitting power in a non-contact manner by electromagnetic coupling between a power transmitting coil and a power receiving coil.

DESCRIPTION OF THE RELATED ART

There has recently been studied the use of a wireless power transmission technology to charge devices with a built-in battery (such as a cell-phone). In the wireless power transmission technology, power can be wirelessly transmitted by disposing resonance coils provided in a wireless power transmitting apparatus (hereinafter simply called the "power transmitting apparatus") and a wireless power receiving apparatus (hereinafter simply called the "power receiving apparatus"), respectively, so as to face each other. Japanese Unexamined Patent Application Publication Nos. 2012-196026 and 2014-023328 disclose examples of a wireless power transmission system using such a wireless power transmission technology.

SUMMARY

However, in the conventional technology, there has been a demand for a power transmitting apparatus which prevents occurrence of overvoltage or overcurrent in a transient state before power transmission is started.

In one general aspect, the techniques disclosed here feature a power transmitting device comprising:

a power transmitting antenna that transmits AC power wirelessly to the power receiving antenna of a power receiving device;

an oscillator that includes i) a first switching element group connected to a high potential terminal of DC power supply and ii) a second switching element group connected to a low potential terminal of the DC power supply, iii) a first terminal connected to the first switching element group and iv) a second terminal connected to the second switching element groups, and the oscillator converts DC power of the DC power supply into the AC power by using the first and second switching element groups and outputs the AC power to the power transmitting antenna via the first terminal and the second terminal;

a communication circuit that receives signals from the power receiving device; and control circuitry operative to:

supply pulse signals which control the first and second switching element groups to the oscillator;

change a phase shift amount between a first pulse signal and a second pulse signal, the first pulse signal supplied to one of the first and second switching element groups, the second pulse signal supplied to the other one of the first and second switching element groups;

cause the oscillator to change the voltage of the AC power output;

set an initial value of the phase shift amount when a current flowing through the power transmitting antenna exceeds a predetermined value after the power transmitting antenna transmits the AC power to the power receiving antenna;

cause the oscillator to output preliminary AC power of a voltage corresponding to the initial value of the phase shift amount, and to reduce the phase shift amount from the initial value, and to output preliminary AC power of each voltage corresponding to each of the reduced phase shift amounts;

fix the phase shift amount when the communication circuit receives a first response signal indicating an activation of a control circuitry in the power receiving device in order to wait for reception of a second response signal indicating a maximum power set in the power receiving device; and cause the oscillator to output the AC power while maintaining the voltage corresponding to the fixed phase shift amount.

According to one aspect of the present disclosure, a power transmitting apparatus can be provided, which prevents occurrence of overvoltage or overcurrent in a transient state before power transmission is started.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a sequence diagram showing operations of a power transmitting apparatus and a power receiving apparatus, and the flow of communication therebetween;

FIG. 8 is a diagram showing a configuration example of a packet transmitted from the power receiving apparatus to the power transmitting apparatus;

FIG. 9 is a flowchart showing operations of a control circuit until a steady state is established after completion of alignment;

DETAILED DESCRIPTION (Underlying Knowledge Forming Basis of the Present Disclosure)

The inventors of the present disclosure have found out that the power transmitting apparatus in the wireless power transmission system described in the section of "Description of the Related Art" has the following problems.

First, description is given of an operation to start power transmission in the wireless power transmission system. When a power switch of the power transmitting apparatus is turned ON, the power transmitting apparatus performs alignment between the power transmitting apparatus and the power receiving apparatus. The "alignment" means an operation of detecting that a power transmitting antenna (including a power transmitting coil) in the power transmitting apparatus and a power receiving antenna (including a power receiving coil) in the power receiving apparatus have an arrangement relationship suitable for power transmission. When the alignment between the power transmitting apparatus and the power receiving apparatus is completed, an object detection is performed to determine whether or not there is a foreign object between the power transmitting apparatus and the power receiving apparatus.

Figure 1:
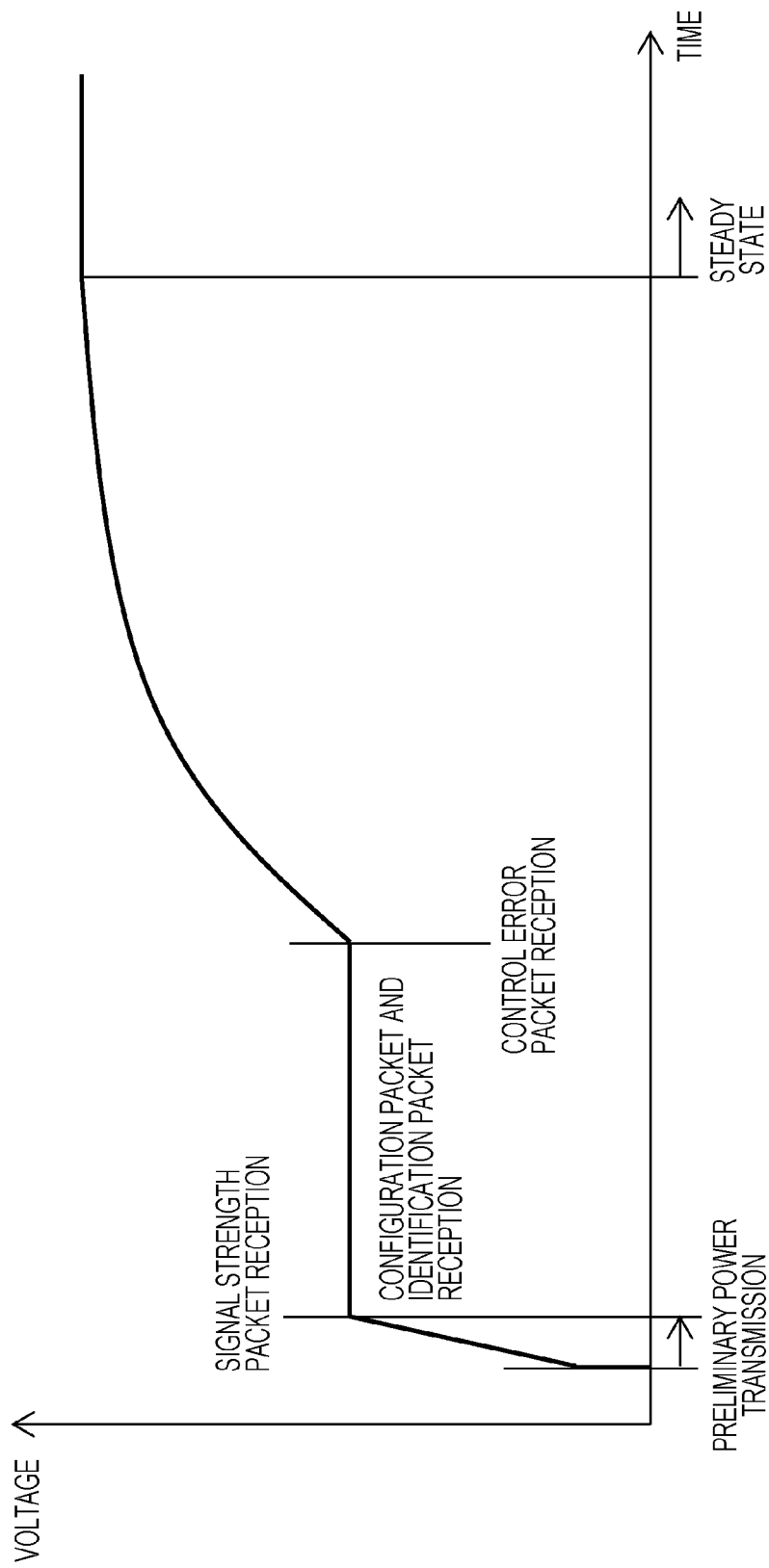
FIG. 1 is a graph showing an example of a time change in an AC voltage applied to a power transmitting coil.

Many devices, which are wirelessly charged, perform power transmission according to the Qi standard designed by wireless power consortium (WPC). According to the Qi standard, when determining that there is no foreign object between the power transmitting apparatus and the power receiving apparatus, the power transmitting apparatus starts transmitting AC power in a non-contact manner to the power receiving apparatus. With reference to FIG. 1, description is given below of a flow of power transmission based on the Qi standard.

FIG. 1 is a graph showing an example of a time change in an AC voltage (hereinafter may be called the "power transmission voltage") to be applied to the power transmitting coil. When the power is turned on, the power transmitting apparatus first gradually increases the power transmission voltage from an initial voltage. When the power transmission voltage exceeds a certain value, a control circuit (e.g., a microcomputer) in the power receiving apparatus is activated. Then, the power receiving apparatus transmits a first response signal (signal strength packet) indicating the activation of the control circuit to the power transmitting apparatus. Upon receipt of the signal strength packet, the power transmitting apparatus maintains the power transmission voltage at a certain voltage. The power transmission performed until the voltage reaches a certain voltage from the initial voltage is hereinafter called "preliminary power transmission". The preliminary power transmission is a transient state with a significant change in power transmission voltage.

Thereafter, the power transmitting apparatus receives various signals from the power receiving apparatus. Such signals include packets such as a second response signal (configuration packet) indicating the maximum power set in the power receiving apparatus, a third response signal (identification packet) indicating information to specify a device, such as a manufacturer ID, a manufacturer code or the like of the power receiving apparatus, and a fourth response signal (control error packet) indicating a control error value (i.e., a difference value between a required voltage value required by the load in the power receiving apparatus and the current voltage value of the load). When determining that the voltage to be applied to the load has not reached the required voltage value (i.e., the control error value is larger than 0) upon receipt of the control error packet, the power transmitting apparatus increases the power transmission voltage until the voltage reaches the required voltage value.

When the power transmission voltage reaches the required voltage value, the power transmitting apparatus controls an oscillation circuit so that the power transmission voltage is maintained at the value at the moment. A state where the power transmission voltage is thus controlled so as to maintain the required voltage value is called a "steady state".

The time for which the preliminary power transmission is performed is about several ms to several tens ms, for example. The time for which the power transmission voltage is maintained at a constant value after the preliminary power transmission is about several tens ms to several hundreds ms, for example. The time between the reception of the control error packet and the shift to the steady state is about several hundreds ms to several s, for example. As shown in FIG. 1, the voltage rapidly rises in a small amount of time in the preliminary power transmission.

As for control in the steady state, there has been known duty control to adjust the power transmission voltage by changing a duty ratio of a pulse signal to be supplied to each of switching elements in the oscillation circuit (e.g., Japanese Unexamined Patent Application Publication Nos. 2012-196026 and 2014-023328). Also, there has been known phase control to adjust the power transmission voltage by changing a phase of a pulse signal to be supplied to each of switching elements in the oscillation circuit.

As described later with reference to FIGS. 13 and 14, it is known that, in the steady state, there is almost no difference between the duty control and the phase control for the magnitude of overvoltage or overcurrent to be generated from the power transmitting coil in the power transmitting apparatus. However, the duty control, which is easier to perform, is generally adopted.

On the other hand, as for a control method in the preliminary power transmission, there have been known no documents suggesting what kind of control method may be used.

Therefore, the inventors of the present disclosure have studied what kind of control method is optimum in the preliminary power transmission.

Since it is a ratio (fluctuation rate) of noise amplitude to a power transmitting side voltage during measurement that affects surrounding electronic devices, the fluctuation rate is calculated.

As a result, it is found out that, in the preliminary power transmission, the overvoltage and overcurrent are increased when the duty control is performed. On the other hand, it is found out that the overvoltage and overcurrent can be suppressed when the phase control according to the present disclosure is performed. As described later with reference to FIGS. 11 and 12, it is found out that the ratio of noise amplitude when the phase control is performed is reduced to about ⅓ of that when the duty control is performed.

Furthermore, it is found out that, in the duty control, the waveform of the AC power (i.e., waveforms of the voltage and current in the power transmitting coil) is distorted and high-frequency noise is emitted to the surroundings of the power transmitting apparatus when the duty ratio is small (i.e., the power transmission voltage is low). On the other hand, it is found out that the distortion in the waveform of the AC power and high-frequency noise associated therewith are reduced when the duty control according to the present disclosure is performed. This effect is described later with reference to FIGS. 15 to 22.

The reason why the waveform of the AC power is distorted when the duty ratio is small is considered to be as follows. In the duty control, the smaller the duty ratio, the longer the time for which two output conductor lines connecting the oscillation circuit to the power transmitting coil are not connected to positive and negative sides of a DC power supply connected to the oscillation circuit. More specifically, the smaller the duty ratio, the longer the time of a floating state of the two output conductor lines. It is conceivable that, when the time of the floating state is long, an influence of electromagnetic waves from the surroundings generates noise in the two output conductor lines, making the overvoltage or overcurrent likely to occur.

On the other hand, the phase control can eliminate the time when the two output conductor lines are not connected to any of the positive and negative sides of the DC power supply connected to the oscillation circuit. Thus, it is conceivable that the occurrence of the overvoltage or overcurrent can be reduced.

As described above, the inventors of the present disclosure have found out a problem that, when the duty control is performed in the preliminary power transmission, the overvoltage or overcurrent is increased, and circuit elements in the power transmitting apparatus may be destroyed. The inventors of the present disclosure have also found out a problem that the waveform of the AC power (i.e., waveforms of the voltage and current in the power transmitting coil) is distorted and high-frequency noise is emitted to the surroundings of the power transmitting apparatus particularly when the duty ratio is small (i.e., the power transmission voltage is low) in the duty control.

Therefore, it is desired to suppress the occurrence of the overvoltage or overcurrent in the preliminary power transmission. Moreover, it is desired to suppress emission of the high-frequency noise around the power transmitting apparatus.

In consideration of the above, the inventors of the present disclosure have reached the aspects disclosed below.

In one general aspect, the techniques disclosed here feature a power transmitting device comprising:

a power transmitting antenna that transmits AC power wirelessly to the power receiving antenna of a power receiving device;

an oscillator that includes i) a first switching element group connected to a high potential terminal of DC power supply and ii) a second switching element group connected to a low potential terminal of the DC power supply, iii) a first terminal connected to the first switching element group and iv) a second terminal connected to the second switching element groups, and the oscillator converts DC power of the DC power supply into the AC power by using the first and second switching element groups and outputs the AC power to the power transmitting antenna via the first terminal and the second terminal;

a communication circuit that receives signals from the power receiving device; and control circuitry operative to:

supply pulse signals which control the first and second switching element groups to the oscillator;

change a phase shift amount between a first pulse signal and a second pulse signal, the first pulse signal supplied to one of the first and second switching element groups, the second pulse signal supplied to the other one of the first and second switching element groups;

cause the oscillator to change the voltage of the AC power output;

set an initial value of the phase shift amount when a current flowing through the power transmitting antenna exceeds a predetermined value after the power transmitting antenna transmits the AC power to the power receiving antenna;

cause the oscillator to output preliminary AC power of a voltage corresponding to the initial value of the phase shift amount, and to reduce the phase shift amount from the initial value, and to output preliminary AC power of each voltage corresponding to each of the reduced phase shift amounts;

fix the phase shift amount when the communication circuit receives a first response signal indicating an activation of a control circuitry in the power receiving device in order to wait for reception of a second response signal indicating a maximum power set in the power receiving device; and cause the oscillator to output the AC power while maintaining the voltage corresponding to the fixed phase shift amount.

Here, a power transmitting device is also referred to as "a power transmitting apparatus", a power receiving device is also referred to as "a power receiving apparatus", an oscillator is also referred to as "a oscillation circuit" or control circuitry is also referred to as "a control circuit".

According to the above aspect, the control circuit sets an initial value of the phase shift amount when the current flowing through the power transmitting antenna exceeds a predetermined value upon reception of the AC power from the power transmitting antenna by the power receiving antenna, and causes the oscillation circuit to output preliminary AC power of a voltage corresponding to the initial value.

The phase shift amount is reduced at predetermined time intervals from the initial value, and the oscillation circuit outputs preliminary AC power of each voltage corresponding to each of the reduced phase shift amounts.

It is preferable that the phase shift amount is reduced at predetermined time intervals from the initial value, and the oscillation circuit outputs preliminary AC power of each voltage corresponding to each of the reduced phase shift amounts. Furthermore, upon receipt of a first response signal indicating the activation of a control circuit in the power receiving apparatus from the power receiving apparatus through the communication circuit, the control circuit fixes the phase shift amount upon the activation of the control circuit in the power receiving apparatus to wait for reception of a second response signal indicating the maximum power set in the power receiving apparatus, and causes the oscillation circuit to output the AC power while maintaining the voltage corresponding to the fixed phase shift amount.

Thus, the phase control to reduce the phase shift amount can eliminate the time when both of a connection between a positive side of the DC power supply connected to the oscillation circuit and a conductor line and a connection between a negative side thereof and a conductor line are not established.

Therefore, in preliminary power transmission with a significant change in power transmission voltage, the magnitude of overvoltage or overcurrent in the phase control can be set smaller than that of overvoltage or overcurrent in duty control. Also, in the preliminary power transmission, a ratio of noise amplitude in the phase control can be reduced to about ⅓ of that in the duty control. Moreover, emission of high-frequency noise around the power transmitting apparatus can be suppressed.

With reference to the drawings, embodiments according to the present disclosure are described in more detail below. Note that, in the following embodiments, the same constituent elements are denoted by the same reference numerals, and description thereof is omitted. Furthermore, the present disclosure is not limited to the following embodiments.

First Embodiment

Figure 2:
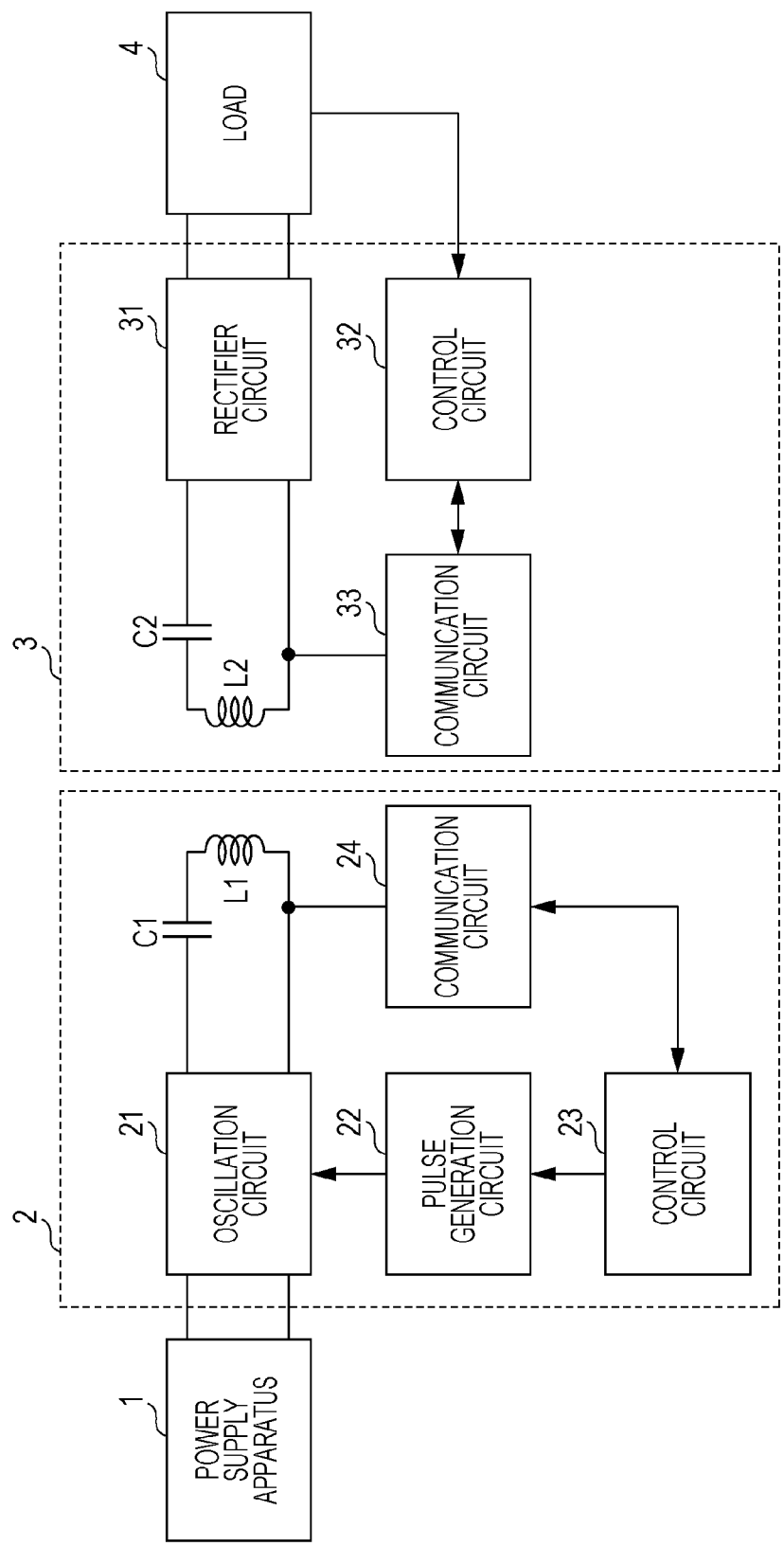
FIG. 2 is a block diagram showing a configuration of a wireless power transmission system according to a first embodiment.

FIG. 2 is a block diagram showing a configuration of a wireless power transmission system 100 according to a first embodiment. The wireless power transmission system 100 includes a power transmitting apparatus 2 and a power receiving apparatus 3. Power is transmitted in a non-contact manner by electromagnetic induction from the power transmitting apparatus 2 to the power receiving apparatus 3. The power transmitting apparatus 2 receives a DC input voltage supplied from a power supply apparatus 1. The power supply apparatus 1 may be an AC/DC converter, for example. The power supply apparatus 1 converts an AC voltage of 100 V or the like, for example, into an arbitrary DC input voltage. The power receiving apparatus 3 supplies the power received from the power transmitting apparatus 2 to a load 4.

The power transmitting apparatus 2 includes an oscillation circuit 21, a pulse generation circuit 22, a control circuit 23, a communication circuit 24, a power transmitting coil L1, and a capacitor C1. The power transmitting coil L1 and the capacitor C1 constitute a power transmitting antenna.

The pulse generation circuit 22 generates pulse signals according to a control signal from the control circuit 23. The pulse signals have a predetermined duty ratio. As described later, a phase of the pulse signals is variably controlled by the control circuit 23. The pulse generation circuit 22 includes a gate driver, for example. An input voltage is supplied to the oscillation circuit 21 from the power supply apparatus 1.

As described later with reference to FIG. 3, the oscillation circuit 21 includes switching elements SW1 to SW4, which are opened and closed according to the pulse signals. The oscillation circuit 21 converts DC input power into AC output power (e.g., high-frequency power), and supplies the AC output power to the power transmitting antenna. The switching elements included in the oscillation circuit 21 may be transistors such as an IGBT (Insulated-gate Bipolar Transistor) and a MOSFET (Metal Oxide Semiconductor Field Effect Transistor), for example.

The control circuit 23 outputs a control signal to instruct the pulse generation circuit 22 to generate a pulse. In this event, the control circuit 23 controls the phase of each pulse signal generated by the pulse generation circuit 22 according to a voltage to be outputted. The control circuit 23 may be realized by an integrated circuit such as a microcomputer, an ASIC (Application Specific IC) and a FPGA (Field Programmable Gate Array), for example.

The communication circuit 24 communicates with the power receiving apparatus 3 to transmit and receive signals required to transmit power. Such signals include, for example, a signal indicating whether or not power needs to be supplied, a signal indicating that the power receiving apparatus 3 is normally activated, and various parameters related to power transmission. Such signals include the first to fourth response signals described above.

The power transmitting coil L1 and the capacitor C1 constitute a resonance circuit, and operate as the power transmitting antenna to be electromagnetically coupled to a power receiving antenna (to be described later) in the power receiving apparatus 3. The power transmitting antenna is a serial resonance circuit in the configuration shown in FIG. 2, but may be a parallel resonance circuit. Alternatively, only the power transmitting coil may be used as the power transmitting antenna. The same goes for the power receiving antenna.

The power receiving apparatus 3 includes a power receiving coil L2, a capacitor C2, a rectifier circuit 31, a control circuit 32, and a communication circuit 33. The load 4 is connected behind the rectifier circuit 31. The power receiving coil L2 and the capacitor C2 constitute a resonance circuit, and operate as the power receiving antenna to be electromagnetically coupled to the power transmitting antenna in the power transmitting apparatus 2. The rectifier circuit 31 rectifies and smoothes the power received from the power transmitting apparatus 2, and supplies the rectified and smoothed power to the load 4. The load 4 notifies the control circuit 32 of whether or not power needs to be supplied. The control circuit 32 uses the communication circuit 33 to notify the power transmitting apparatus 2 of whether or not power needs to be supplied. When power supply to the load 4 is started as the power to be transmitted from the power transmitting apparatus 2 to the power receiving apparatus 3 has reached a sufficient level (i.e., the control circuit 32 in the power receiving apparatus 3 is normally activated), the control circuit 32 notifies the power transmitting apparatus 2 to that effect using the communication circuit 33. A signal to be transmitted here is the first response signal (a signal strength packet in the Qi standard)

described above. The communication circuit 33 similarly transmits the second to fourth response signals described above.

The power receiving apparatus 3 may be, for example, an electronic device such as a smartphone, a tablet terminal device and a portable terminal device, or a motor-driven machine such as an electric vehicle. The power transmitting apparatus 2 may be a charger that supplies power in a non-contact manner to the power receiving apparatus 3. The load 4 includes a secondary battery, for example, and may be charged with the DC power outputted from the power receiving apparatus 3.

During power transmission from the power transmitting apparatus 2 to the power receiving apparatus 3, the communication circuit 24 in the power transmitting apparatus 2 and the communication circuit 33 in the power receiving apparatus 3 establish communication therebetween, and transmit and receive signals required for power transmission. When the power transmission is suspended such as upon detection of a foreign object near the power transmitting apparatus 2 or the power receiving apparatus 3, the communication circuit 24 in the power transmitting apparatus 2 and the communication circuit 33 in the power receiving apparatus 3 also suspend the communication.

As a communication method, there is a method in which a switch that changes load impedance is provided at an output end of the rectifier circuit 31, for example, and the switch is turned on and off at a frequency sufficiently different from that of the oscillation circuit 21. In other words, there is a method in which a passive element such as a resistor and a capacitor is provided in parallel with the load 4, and the load impedance is changed by switching conduction of the connection. Since a change in load impedance also changes the voltage or current in the power transmitting apparatus 2, information can be transmitted to the power transmitting apparatus 2 by switching between the opened and closed states of the switch. The communication circuit 24 in the power transmitting apparatus 2 can read the transmitted information through demodulation by detecting a change in physical amount of the voltage, current or the like in the power transmitting apparatus 2, which is caused by switching on and off the switch. The physical amount detected here may be a voltage between both ends of the power transmitting antenna or an amount of current generated at an input end of the oscillation circuit 21, for example. A method for transmitting the information is not limited to the above method, but a completely different communication method may be used, such as NFC (Near Field Communication) or Wireless LAN.

When power transmission is first started or resumed after suspended, the power transmitting apparatus 2 needs to increase the value of the output power from the one during the stop of the power transmission to the one during the power transmission. The power transmitting apparatus 2 operates as follows to increase the value of the output power from the one during the stop of the power transmission to the one during the power transmission. The occurrence of an overvoltage and an overcurrent can be prevented by control to be described later. Such control can also prevent the occurrence of distortion in the waveforms of an output voltage and an output current.

The oscillation circuit 21 converts DC power, which is supplied from the power supply apparatus 1 that is a DC power supply, into AC power using a first switching element group (the switching elements SW1 and SW3) connected to the high potential side of the DC power and a second switching element group (the switching elements SW2 and SW4) connected to the low potential side of the DC power. Then, the oscillation circuit 21 outputs the AC power to the power transmitting antenna through a first output end connected to the first switching element group and a second output end connected to the second switching element group. Although the oscillation circuit 21 includes the four switching elements in this embodiment, each of the first and second switching element groups may include at least two switching elements.

The control circuit 23 supplies pulse signals to control the first and second switching element groups to the oscillation circuit 21 through the pulse generation circuit 22. Upon start of power transmission, the control circuit 23 changes a phase shift amount of the pulse signal supplied to one of the first and second switching element groups with respect to the pulse signal supplied to the other thereof. Thus, the control circuit 23 changes the voltage of the AC power to be outputted from the oscillation circuit 21. Such control is called phase control.

When the current flowing through the power transmitting antenna exceeds a predetermined value upon reception of the AC power from the power transmitting antenna by the power receiving antenna, the control circuit 23 sets an initial value of the phase shift amount, and causes the oscillation circuit 21 to output preliminary AC power of a voltage corresponding to the initial value. Then, the control circuit 23 gradually reduces the phase shift amount from the initial value, and causes the oscillation circuit 21 to output preliminary AC power of each voltage corresponding to each of the gradually reduced phase shift amounts. Furthermore, upon receipt of a first response signal indicating the activation of the control circuit 32 in the power receiving apparatus 3 from the power receiving apparatus 3 through the communication circuit 24, the control circuit 23 fixes the phase shift amount upon the activation of the control circuit 32 in the power receiving apparatus 3, and waits for reception of a second response signal indicating the maximum power set in the power receiving apparatus 3. In this event, the control circuit 23 causes the oscillation circuit 21 to output the AC power while maintaining the voltage corresponding to the fixed phase shift amount.

The control circuit 23 performs the phase control to control an "output time ratio" of the power transmitting apparatus 2. Here, the "output time ratio" means a ratio of time when a voltage having an absolute value greater than a predetermined value (e.g., about several % to 20% of the absolute value of amplitude) is generated in one period of the AC voltage in the power transmitting antenna (the power transmitting coil L1 and the capacitor C1). The larger the output time ratio, the larger the amplitude of a voltage VL1 to be applied to the power transmitting coil L1. As a result, the power to be transmitted to the power receiving apparatus 3 from the power transmitting apparatus 2 is also increased. The output time ratio can be controlled by adjusting the phase of the pulse signal to be applied to each of the switching elements SW1 to SW4. In this embodiment, the output time ratio of the power transmitting apparatus 2 is controlled by controlling a phase shift amount $\varphi$ between the pulse signals to be applied to the switching elements SW1 to SW4.

The control circuit 23 may also control the frequency of the output voltage in addition to the output time ratio of the output voltage of the oscillation circuit 21.

Figure 3:
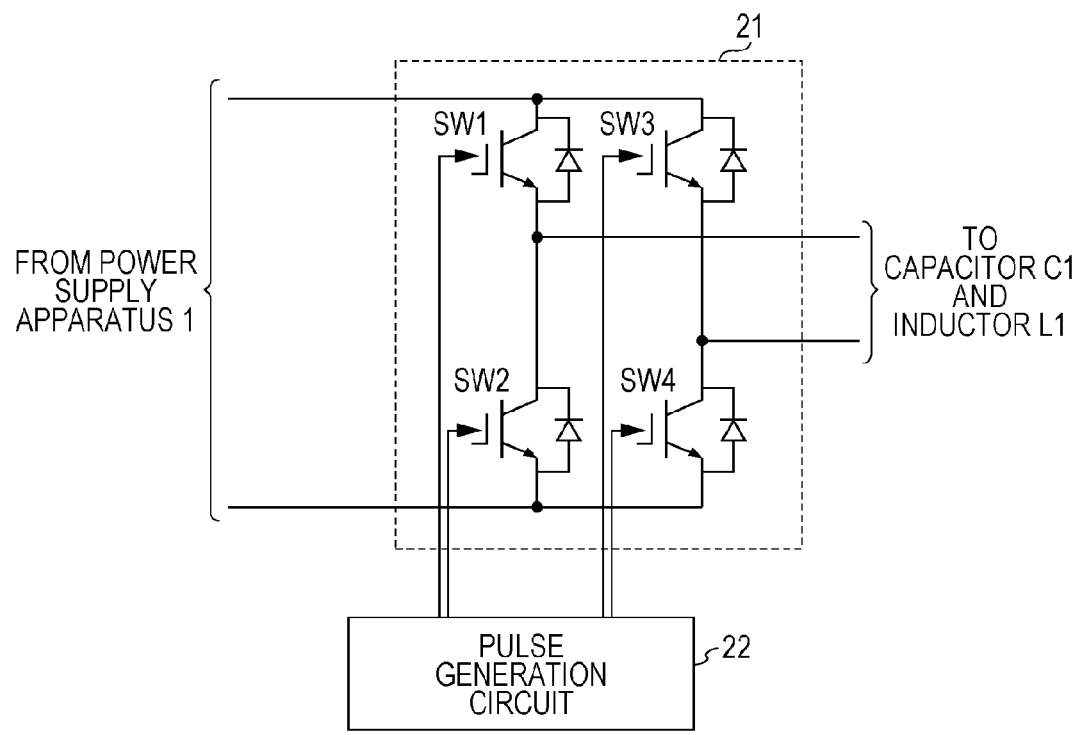
FIG. 3 is a circuit diagram showing a configuration of an oscillation circuit in FIG. 2.

FIG. 3 is a circuit diagram showing a configuration example of the oscillation circuit 21 shown in FIG. 2. In the example of FIG. 3, the oscillation circuit 21 includes four switching elements SW1 to SW4. The switching elements SW1 and SW2 are series-connected to each other, and the switching elements SW3 and SW4 are series-connected to each other. The switching elements SW1 to SW4 can be set in a conduction state by the pulse generation circuit 22 applying pulse signals to gates of the switching elements SW1 to SW4. In the present specification, a state where a current flows through each of the switching elements SW1 to SW4 (e.g., a state where a voltage is applied to the gate of each of the switching elements SW1 to SW4) is called "on", while a state where no current flows through each of the switching elements SW1 to SW4 (e.g., a state where no voltage is applied to the gate of each of the switching elements SW1 to SW4) is called "off". When the switching elements SW1 and SW4 are turned on at the same time, a positive output voltage (a voltage having the same polarity as that of the input voltage) is supplied to the power transmitting antenna. Meanwhile, when the switching elements SW2 and SW3 are turned on at the same time, a negative output voltage (a voltage having a polarity opposite to that of the input voltage) is supplied to the power transmitting antenna. The DC input voltage can be converted into the AC output voltage by alternately repeating, at a predetermined frequency, a state where the switching elements SW1 and SW4 are turned on and the switching elements SW2 and SW3 are turned off and a state where the switching elements SW2 and SW3 are turned on and the switching elements SW1 and SW4 are turned off.

Note that, although not shown in FIG. 3, the oscillation circuit 21 may include another element, such as a filter circuit, to supply a sinusoidal current to the power transmitting coil L1 by smoothing the output current in the oscillation circuit 21.

Figure 4:
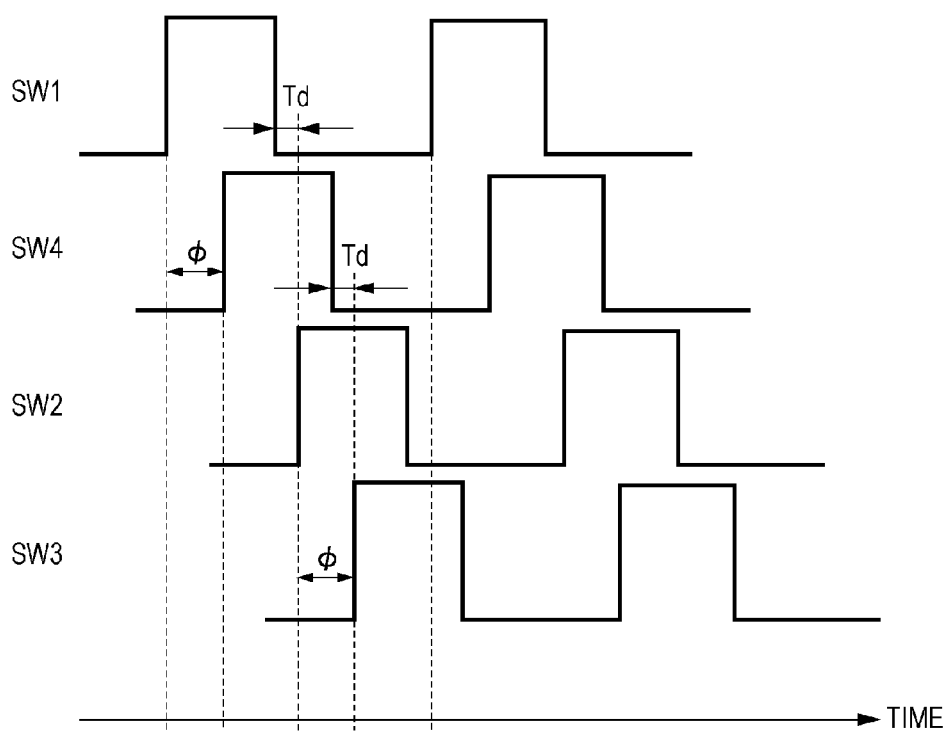
FIG. 4 is a timing chart showing an example of pulse signals applied to switching elements in FIG. 3.

FIG. 4 is a timing chart showing an example of pulse signals applied to the switching elements SW1 to SW4 shown in FIG. 3. The control circuit 23 controls the phases of the pulse signals such that the pulse signal applied to the switching element SW4 has a phase shift amount $\varphi$ with respect to the pulse signal applied to the switching element SW1 and that the pulse signal applied to the switching element SW3 has a phase shift amount $\varphi$ with respect to the pulse signal applied to the switching element SW2. Particularly, the control circuit 23 controls the phases of the pulse signals such that the switching element SW3 or SW4 is turned on when the switching elements SW1 and SW2 are turned off at the same time and that the switching element SW1 or SW2 is turned on when the switching elements SW3 and SW4 are turned off at the same time. In other words, the rise of the pulse signal applied to the switching element SW4 is within a time period in which the pulse signal applied to the switching element SW1 is at a high level, and the fall of the pulse signal applied to the switching element SW4 is within a time period in which the pulse signal applied to the switching element SW2 is at a high level. Furthermore, the rise of the pulse signal applied to the switching element SW3 is within a time period in which the pulse signal applied to the switching element SW2 is at a high level, and the fall of the pulse signal applied to the switching element SW3 is within a time period in which the pulse signal applied to the switching element SW2 is at a high level. The control circuit 23 can change the output power of the oscillation circuit 21 by changing the phase shift amount $\varphi$ so as to meet the conditions described above.

According to the pulse signals shown in FIG. 4, the switching elements SW1 and SW2 have a dead time Td when the both switching elements are turned off. Likewise, the switching elements SW3 and SW4 also have a dead time Td when the both switching elements are turned off. The reason why such dead times are provided is to reduce a possibility that the switching elements are broken by short-circuiting between the potential of the input voltage and the ground potential, which is caused by turning on of the switching elements SW1 and SW2 at the same time or turning on of the switching elements SW3 and SW4 at the same time at the moment of the rise and fall of the pulse signals. Therefore, in the example shown in FIG. 3, a duty ratio of each pulse signal is set to a value smaller than 50%. However, it is not imperative to provide the dead time, and the duty ratio of each pulse signal may be 50%.

According to the pulse signals shown in FIG. 4, all the switching elements SW1 to SW4 are not turned off at the same time, and at least one of the switching elements is always turned on. This avoids the occurrence of the floating described above, making the overvoltage, overcurrent and noise less likely to occur in the power transmitting apparatus 2.

Figure 5:
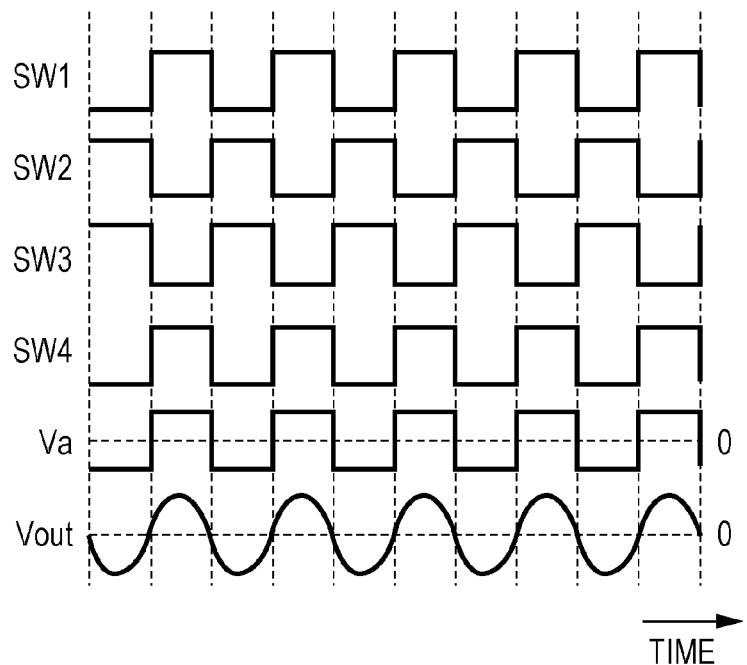
FIG. 5 is a timing chart showing an example of waveforms of pulse signals and output voltages when a phase shift amount is 0 degrees.
Figure 6:
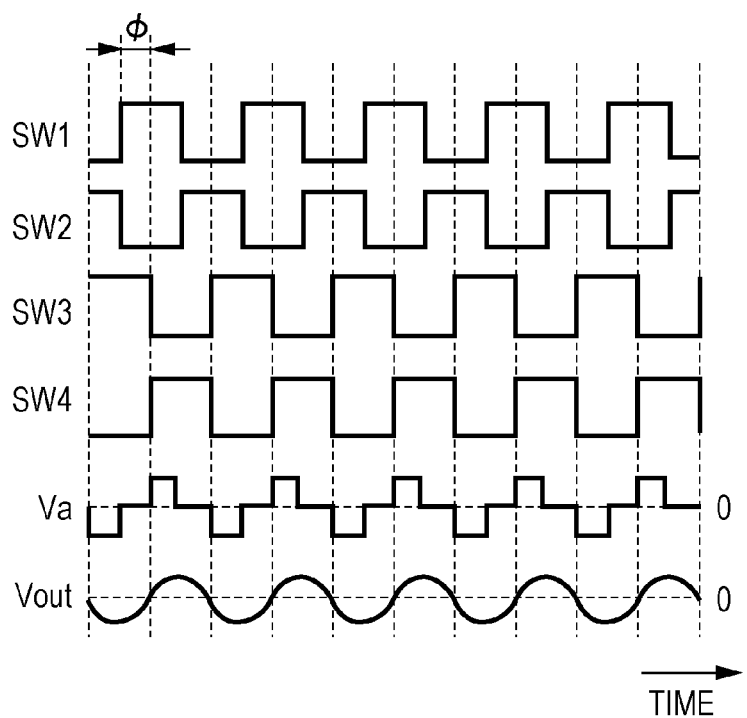
FIG. 6 is a timing chart showing an example of waveforms of pulse signals and output voltages when a phase shift amount is 90 degrees.

FIG. 5 is a timing chart showing an example of waveforms of pulse signals, an output voltage Va of the oscillation circuit 21 and a voltage Vout after smoothing Va when the phase shift amount $\varphi$ is 0 degrees. FIG. 6 is a timing chart showing an example of waveforms of pulse signals, an output voltage Va of the oscillation circuit 21 and a voltage Vout after smoothing Va when the phase shift amount $\varphi$ is 90 degrees. In FIGS. 5 and 6, to simplify the illustration, the dead times of the switching elements SW1 to SW4 are not provided. FIG. 5 shows an example of the waveform of a pulse signal having a phase shift amount $\varphi=0$ degrees, which is applied to each of the switching elements SW1 to SW4, the waveform of the output voltage Va of the oscillation circuit 21, and the waveform of the output voltage Vout of a sine wave obtained by smoothing the output voltage Va of the oscillation circuit 21 by the resonance circuit of the power transmitting antenna (the power transmitting coil L1 and the capacitor C1). FIG. 6 shows an example of such waveforms when the phase shift amount $\varphi$ is 90 degrees. As shown in FIGS. 5 and 6, by increasing the phase shift amount $\varphi$ to be larger than 0 degrees, the output time ratio of the output voltage Va of the oscillation circuit 21 is reduced, and the amplitude of the output voltage Vout of the sine wave can be reduced.

The control circuit 23 controls the phase shift amount $\varphi$ by temporally shifting the rise and fall of the pulse signals applied to the switching elements SW3 and SW4 with respect to the rise and fall of the pulse signals applied to the switching elements SW1 and SW2. Thus, the output time ratio of the output voltage Va of the oscillation circuit 21 is changed. As a result, the power to be transmitted to the power receiving apparatus 3 from the power transmitting apparatus 2 is changed.

Next, description is given of operations of the wireless power transmission system 100 according to this embodiment. The power transmitting apparatus 2 according to this embodiment performs power transmission according to the Qi standard. However, this is just an example, and it is not imperative to perform the power transmission according to the Qi standard.

FIG. 7 is a sequence diagram showing operations of the power transmitting apparatus 2 and the power receiving apparatus 3, and the flow of communication therebetween. Upon completion of alignment with the power receiving apparatus 3, the power transmitting apparatus 2 starts preliminary power transmission. The alignment is performed, for example, by detecting that a current flowing through the power transmitting antenna exceeds a predetermined value upon reception of the AC power from the power transmitting antenna by the power receiving antenna. A change in voltage or power, instead of the current, may be detected.

In the preliminary power transmission, the control circuit 23 in the power transmitting apparatus 2 first sets a predetermined phase shift amount (e.g., 162 degrees) to an initial value $\varphi_1$, and starts power transmission. In this event, it is assumed that the voltage of the power transmitting coil is $V_1$. Then, the control circuit 23 gradually reduces the phase shift amount. For example, the phase shift amount is reduced in increments of a certain amount at regular time intervals. In the example shown in FIG. 7, the phase shift amount is changed in stages such as $\varphi_1, \varphi_2, \ldots \varphi_N$ (as for the voltage, $V_1, V_2, \ldots V_N$). Here, it is assumed that the control circuit 32 and the communication circuit 33 in the power receiving apparatus 2 are activated when the phase shift amount reaches $\varphi_N$. As the control circuit 32 and the communication circuit 33 are activated, the communication circuit 33 transmits a first response signal (signal strength packet) to the power transmitting apparatus 2, the first response signal including a signal strength value indicating a voltage corresponding to the phase shift amount at the time. Upon receipt of the first response signal, the power transmitting apparatus 2 confirms the activation of the power receiving apparatus. Thus, the preliminary power transmission is completed.

Subsequently, the power transmitting apparatus 2 receives various signals (packets) from the power receiving apparatus 3 while maintaining the phase shift amount at $\varphi_N$. Such signals include packets such as a second response signal (configuration packet) indicating the maximum power set in the power receiving apparatus, a third response signal (identification packet) indicating information to specify a device, such as a manufacturer ID of the power receiving apparatus, a manufacturer code, and a basic device identifier, and a fourth response signal (control error packet) indicating a difference value (control error value) between a required voltage value required by the load of the power receiving apparatus and the current voltage value of the load. Such packets can be used to determine power transmission conditions for the power transmitting apparatus 2 and to authenticate the power receiving apparatus.

Here, with reference to FIG. 8, a configuration of such packets is described.

FIG. 8 is a diagram showing a configuration example of the packets. Each of the packets to be transmitted from the power receiving apparatus 3 includes a header, a message and a checksum. The header includes a packet type. The packet type is information to identify the type, such as the signal strength packet, configuration packet and control error packet described above. Although types other than those shown in FIG. 8 are also defined in the Qi standard, such types are irrelevant to the nature of this embodiment, and thus description thereof is omitted. In the message, individual information is described for each packet type. For example, for the signal strength packet, information indicating a signal strength value is described. The checksum includes an error detection code.

Upon receipt of the fourth response signal (control error packet), the control circuit 23 in the power transmitting apparatus 2 increases a power transmission voltage by reducing the phase shift amount again. The following operations are called "main power transmission". The control circuit 23 gradually reduces the phase shift amount until the control error value indicated by the fourth response signal reaches 0 (to be exact, until a difference from 0 becomes less than a predetermined value). When detecting that the control error value has become substantially equal to 0, the control circuit 23 fixes the phase shift amount to the value at the moment ($\varphi_{N+M}$ in the example of FIG. 7), and continues the power transmission. From this moment on, a steady state with no significant change in power transmission voltage is established. However, the control error value is shifted from 0 when the power receiving apparatus 3 is moved relative to the power transmitting apparatus 2 or when a foreign object approaches between the power transmitting apparatus 2 and the power receiving apparatus 3. Therefore, the control circuit 23 periodically monitors the fourth response signal (control error packet) to maintain the power transmission voltage within an appropriate range. Thus, the control circuit 23 controls the output voltage by adjusting the phase shift amount even in the steady state.

The time for which the preliminary power transmission is performed is about several ms to several tens ms, for example, and is about 10 ms in one example. The time between the completion of the preliminary power transmission and the start of the main power transmission is about several tens ms to several hundreds ms, for example, and is about 100 ms in one example. The time between the first reception of the control error packet and the shift to the steady state is about several hundreds ms to several s, for example, and is about 1 s in one example. As already described with reference to FIG. 1, the voltage rapidly rises in a small amount of time in the preliminary power transmission.

Next, with reference to FIG. 9, more detailed description is given of the operations of the control circuit 23 in the power transmitting apparatus 2.

FIG. 9 is a flowchart showing operations of the control circuit 23 until the steady state is established after the completion of the alignment.

When the alignment is completed, the control circuit 23 performs processing to start the preliminary power transmission. The control circuit 23 first sets the predetermined phase shift amount $\varphi$ to the initial value $\varphi_1$ (Step S102). Next, the control circuit 23 causes the oscillation circuit 21 to generate AC power for a certain period of time (Step S103). Then, the control circuit 23 determines whether or not a signal strength packet is received from the power receiving apparatus 3 (Step S104). When no signal strength packet is received yet, the control circuit 23 determines whether or not the phase shift amount $\varphi$ has reached a lower limit (e.g., a specified value close to 0) (Step S105). When the phase shift amount $\varphi$ has not reached the lower limit, the control circuit 23 reduces the phase shift amount by $\Delta_\varphi$ (Step S106) and then returns to Step S103. When determining in Step S105 that the phase shift amount $\varphi$ has reached the lower limit, the control circuit 23 changes the frequency of the AC power by a predetermined amount (Step S107) and then returns to Step S102. In Step S107, the control circuit 23 increases the voltage by reducing the frequency in increments of 1 kHz, for example.

When determining in Step S104 that the signal strength packet is received from the power receiving apparatus 3, the control circuit 23 terminates the preliminary power transmission and confirms the activation of the power receiving apparatus 3 (Step S108). Then, the power transmitting apparatus 2 receives a configuration packet and an identification packet (Step S109), and further receives a control error packet (Step S110). The control circuit 23 determines whether or not a control error value indicated by the control error packet is substantially equal to 0 (Step S111). This determination is performed based on whether or not a difference between the control error value and 0 is smaller than a predetermined threshold. When determining that the control error value is still not 0, the control circuit 23 reduces the phase shift amount φ by $\Delta_\varphi$ (Step S112) and then returns to Step S110. The control circuit 23 repeatedly executes Steps S110 to S112 until the control error value reaches approximately 0. When the control error value reaches approximately 0, the control circuit 23 starts power transmission while fixing the phase shift amount to the value at the moment. Thus, a shift is made to the steady state.

Note that the first to fourth response signals described above do not always have to be the packets specified in the Qi standard. For example, a first response signal to the preliminary AC power may be used as the first response signal. Moreover, an arbitrary signal including control information to be used for transmission of the AC power may be used as the second response signal.

As described above, the control circuit 23 according to this embodiment fixes the phase shift amount upon activation of the control circuit 32 in the power receiving apparatus 3 to wait for the second response signal including the control information used for transmission of the AC power to be received from the power receiving apparatus 3, upon receipt of the first response signal to the preliminary AC power from the power receiving apparatus 3 through the communication circuit 24. Then, the control circuit 23 causes the oscillation circuit 21 to output the AC power while maintaining the voltage corresponding to the fixed phase shift amount. Such operations can suppress overvoltage and overcurrent particularly in initial power transmission, as described later with reference to FIGS. 11 and 12.

Figure 10:
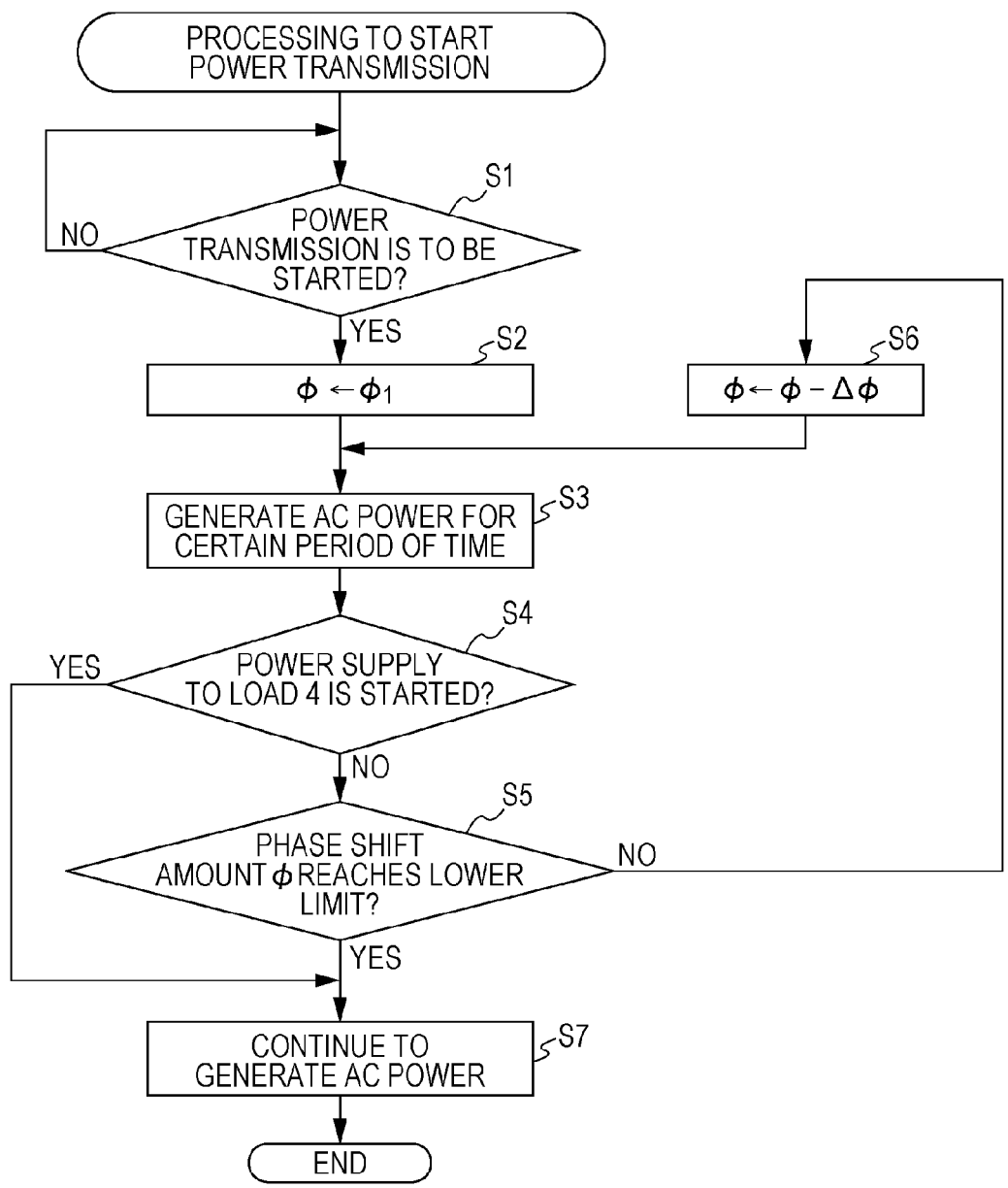
FIG. 10 is a flowchart showing another example of processing to start power transmission.

Next, with reference to FIG. 10, description is given of another example of the operations of the wireless power transmission system 100.

FIG. 10 is a flowchart showing another example of processing to start power transmission executed by the control circuit 23. In this example, the control circuit 23 gradually increases the output power of the oscillation circuit 21 from a value during the stop of the power transmission to a value during the power transmission (during a steady operation) regardless of the packet signals transmitted from the power receiving apparatus 3.

In Step S1 of FIG. 10, the control circuit 23 determines whether or not power transmission is to be started. If the result of the determination is YES, the processing advances to Step S2, and if NO, Step S1 is repeated. The power transmitting apparatus 2 determines to start the power transmission when the presence of the power receiving apparatus 3 is detected or when requested by the power receiving apparatus 3 to start the power transmission, for example.

In Step S2, the control circuit 23 sets the phase shift amount φ to a predetermined initial value φ1. When dead times of the switching elements SW1 to SW4 are provided, the initial value φ1 of the phase shift amount φ is determined so as to turn on the switching element SW3 or SW4 when the switching elements SW1 and SW2 are turned off at the same time, and to turn on the switching element SW1 or SW2 when the switching elements SW3 and SW4 are turned off at the same time. When the dead time Td has a length corresponding to the phase shift amount of, for example, 5 to 10 degrees, the initial value φ0 of the phase shift amount φ is set to 170 to 175 degrees or less. When no dead time is provided, the initial value φ0 of the phase shift amount φ is set to an arbitrary value of 180 degrees or less.

Next, in Step S3, the control circuit 23 causes the pulse generation circuit 22 and the oscillation circuit 21 to generate AC output power (e.g., high-frequency power) for a certain period of time (e.g., 1 millisecond).

In Step S4, the control circuit 23 determines whether or not power supply to the load 4 is started as the power to be transmitted from the power transmitting apparatus 2 to the power receiving apparatus 3 has reached a sufficient level. The processing advances to Step S7 if the result of the determination is YES, and advances to Step S5 if NO. The control circuit 23 determines whether or not power supply to the load 4 is started, based on the signal received from the power receiving apparatus 3 through the communication circuit 24, for example.

In Step S5, the control circuit 23 determines whether or not the phase shift amount φ has reached a lower limit (0 degrees). The processing advances to Step S7 if the result of the determination is YES, and advances to Step S6 if NO.

In Step S6, the control circuit 23 reduces the phase shift amount φ by a predetermined step width Δφ (e.g., 5 degrees). The step width Δφ can be set to an arbitrary value according to the actual design of the wireless power transmission system 100.

After Step S6, the processing advances to Step S3 again, where the control circuit 23 causes the pulse generation circuit 22 and the oscillation circuit 21 to generate AC power for a certain period of time. Since the phase shift amount φ is reduced in Step S6, the voltage of the generated AC power is increased.

By repeating Steps S3 to S6, the control circuit 23 changes the phase shift amount of each pulse signal after every elapse of a predetermined time period. As the phase shift amount is changed, the voltage of the high-frequency power to be generated is also increased.

In Step S7, the control circuit 23 continues the generation of the high-frequency power. When the power to be transmitted from the power transmitting apparatus 2 to the power receiving apparatus 3 has reached the sufficient level, the power receiving apparatus 3 starts power supply to the load 4.

Although the phase shift amount φ is reduced in Step S6 in FIG. 10, the phase shift amount φ may be increased instead. This is effective in reducing the output power from the value during the power transmission to the value during the stop of the power transmission. Moreover, reduction in the phase shift amount φ is also effective in reducing distortion in output voltage and output current of the power transmitting apparatus 2.

Next, with reference to FIGS. 11 to 14, a wireless power transmission system according to an example of the present disclosure is compared with a wireless power transmission system according to a comparative example. The both systems have the configuration shown in FIGS. 2 and 3. The wireless power transmission system of the example gradually increases the output power of the power transmitting apparatus 2 by gradually reducing the phase shift amount φ through the operations shown in FIGS. 7 and 9. On the other hand, the wireless power transmission system of the comparative example gradually increases the output power of the power transmitting apparatus 2 by gradually reducing a duty ratio of each pulse instead of the phase shift amount.

Figure 11:
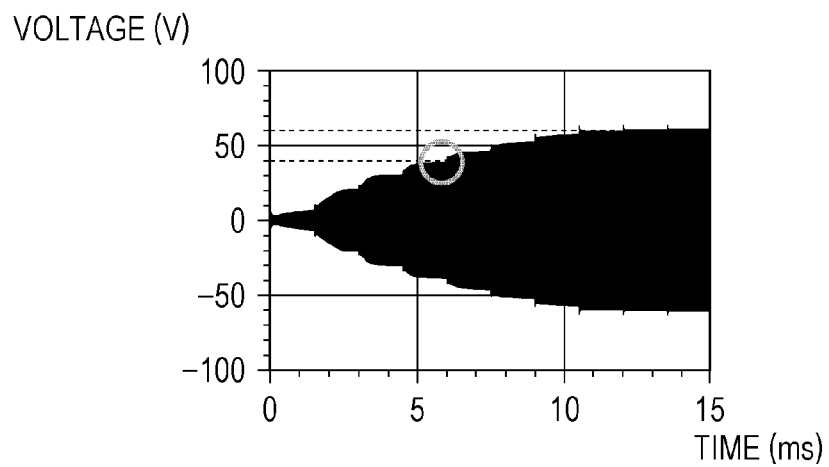
FIG. 11 is a diagram showing fluctuations in a voltage of a capacitor during a preliminary power transmission period in an example (phase control)
Figure 12:
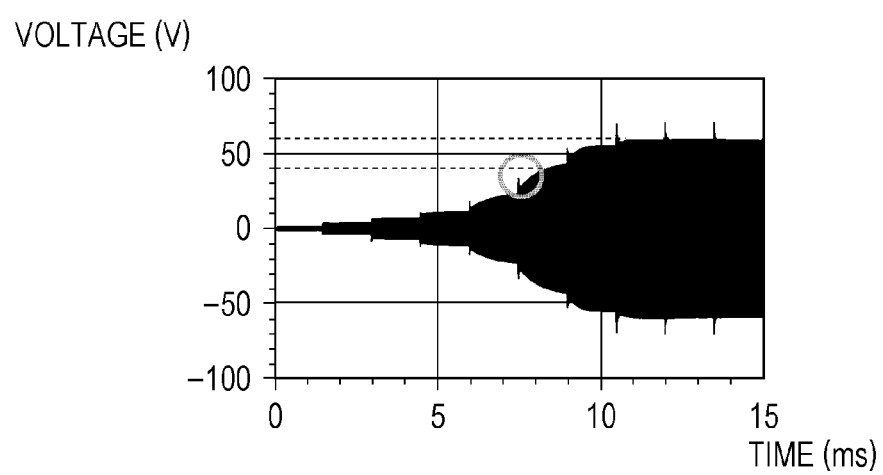
FIG. 12 is a diagram showing fluctuations in a voltage of a capacitor during a preliminary power transmission period in a comparative example (duty control)

FIG. 11 is a diagram showing fluctuations in a voltage (VC1) (hereinafter may be called the "power transmitting side voltage") of a capacitor C1 during a preliminary power transmission period in the example (phase control). FIG. 12 is a diagram showing fluctuations in a voltage (VC1) of a capacitor C1 during a preliminary power transmission period in the comparative example (duty control).

In the example and comparative example, the time (15 ms) required for the power transmitting side voltage to be increased from 0 V to 60 V (power transmitting side voltage corresponding to a required voltage) is split into ten parts, and the phase or duty ratio is changed at intervals of 1.5 ms. In the example (phase control), the phase shift amount is changed in the order of 162 degrees, 144 degrees, 126 degrees, 108 degrees, 90 degrees, 72 degrees, 54 degrees, 36 degrees, 18 degrees, and 0 degrees. In the comparative example (duty control), the duty ratio of the pulse is changed in the order of 5%, 10%, 15%, 20%, 25%, 30%, 35%, 40%, 45%, and 50%.

The first response signal indicating the activation of the control circuit 32 (microcomputer) in the power receiving apparatus 3 is set to be received when the power transmitting side voltage (VC1) is 40 V. In other words, a period when the power transmitting side voltage is 0 V to 40 V is the preliminary power transmission period.

In the preliminary power transmission period, the maximum value of noise amplitude of the voltage is detected. As a result, the noise amplitude reaches its maximum at the points indicated by the circles in FIGS. 11 and 12. The change condition in this event is when the phase shift amount is changed from 108 degrees to 90 degrees in the example, and is when the duty ratio is changed from 25% to 30% in the comparative example. The maximum value of the noise amplitude is 5.3 V in the example and 11.2 V in the comparative example.

Moreover, it is a ratio (fluctuation rate) of the noise amplitude to the power transmitting side voltage during measurement that affects surrounding electronic devices. Thus, the fluctuation rate is calculated.

The ratio of the noise amplitude is 13% (5.3 V/40 V) in the example (phase control), and is 37% (11.2 V/30 V) in the comparative example (duty control). More specifically, the ratio of the noise amplitude in the example is reduced to about ⅓ of the ratio of the noise amplitude in the comparative example.

As described above, according to the phase control of the example, it is found out that the ratio of the noise amplitude can be suppressed to about ⅓, compared with the duty control, in the preliminary power transmission. As a result, in the example, the overvoltage and overcurrent during the preliminary power transmission period can be suppressed compared with the comparative example.

Note that the phase control and duty control during the preliminary power transmission period are open control (one-way control by the control circuit in the power transmitting apparatus) rather than feedback control to be described later.

Next, a simulation result in the steady state is described.
In the steady state, the following simulation is performed to examine advantages of the phase control compared with the duty control.

In the steady state, the feedback control using a control error value indicated by a control error packet is performed. Once the power transmission voltage stays at 60 V, fluctuation in the power transmission voltage is smaller than that during the preliminary power transmission. Then, the phase shift amount or the duty ratio is changed at predetermined intervals for a long period of time. Every time such changes are made, noise is generated.

Therefore, noise amplitude is measured under the following conditions after the power transmitting side voltage reaches 60 V, which is the voltage corresponding to the required voltage, and stays at 60 V (steady state). In the example, the phase shift amount is changed in the order of 108 degrees, 90 degrees, 108 degrees, 90 degrees, . . . at intervals of 3 ms, and the noise amplitude is measured at every change. Meanwhile, in the comparative example, the duty ratio is changed in the order of 20%, 25%, 20%, 25%, . . . at intervals of 3 ms, and the noise amplitude is measured at every change.

Table shows measurement results of the noise amplitude and the average thereof in the example (phase control) and comparative example (duty control).

TABLE

|   | Noise (V) in Example | Noise (V) in Comparative Example |
|---|---|---|
| ① | 3.173 | 9.025 |
| ② | 2.96 | 2.351 |
| ③ | 3.159 | 8.892 |
| ④ | 2.973 | 2.368 |
| ⑤ | 3.158 | 8.888 |
| ⑥ | 2.965 | 2.367 |
| ⑦ | 3.157 | 8.887 |
| ⑧ | 2.969 | 2.375 |
| ⑨ | 3.157 | 8.889 |
| ⑩ | 2.962 | 2.3588 |
| Average | 3.0633 | 5.64008 |

Figure 13:
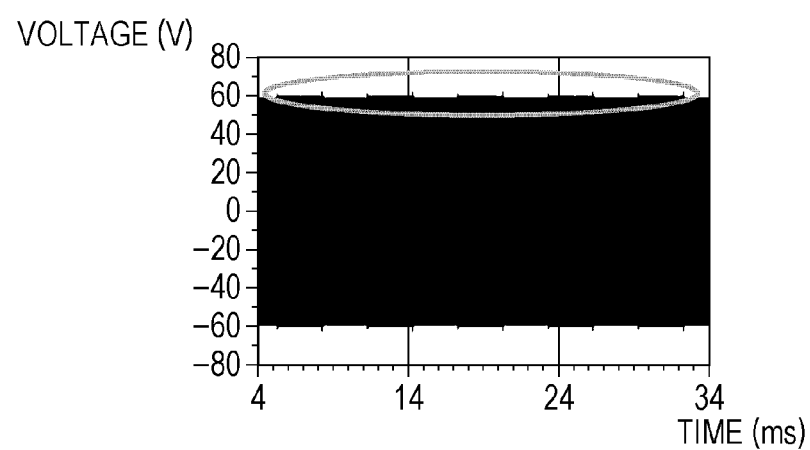
FIG. 13 is a diagram showing fluctuations in the voltage of the capacitor in a steady state in the example (phase control)
Figure 14:
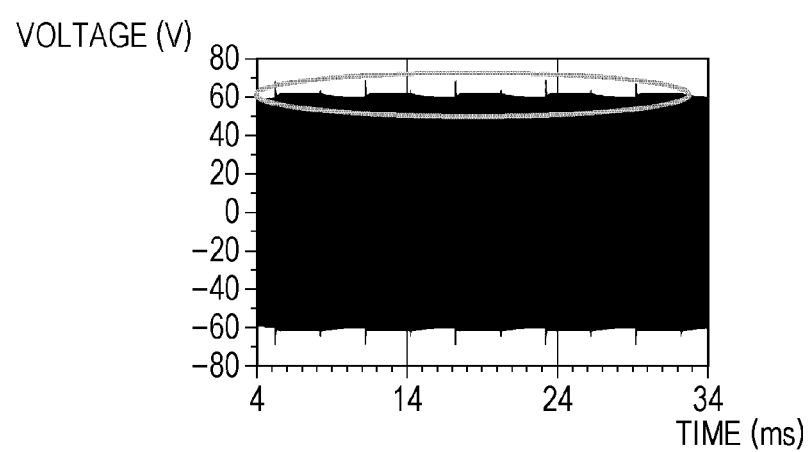
FIG. 14 is a diagram showing fluctuations in the voltage of the capacitor in a steady state in the comparative example (duty control)

FIG. 13 is a diagram showing fluctuations in the voltage (VC1) of the capacitor C1 in the steady state in the example (phase control). FIG. 14 is a diagram showing fluctuations in the voltage (VC1) of the capacitor C1 in the steady state in the comparative example (duty control). Note that, unlike the results shown in FIGS. 11 and 12, the steady state is already established at the point of 4 ms in the simulation results shown in FIGS. 13 and 14. This is because the simulation in the steady state starts at the point when 4 ms has passed since a predetermined point when the voltage stays at 60 V after immediately increased to 60 V. Other conditions are the same as those for the simulation shown in FIGS. 11 and 12. Since it is a ratio (fluctuation rate) of the noise amplitude to the power transmitting side voltage during measurement that affects surrounding electronic devices, the fluctuation rate is calculated. Also, the average value of the fluctuation rates in the steady state is calculated.

From the results shown in Table, the average value of the fluctuation rates in the duty control is about 9.3% (5.6 V/60 V), while the average value of the fluctuation rates in the phase control is about 5.1% (3.1 V/60 V).

As described above, in both of the duty control and the phase control, the ratio of the noise amplitude is smaller than the maximum value (37% in the duty control) of the ratio of the noise amplitude in the preliminary power transmission. Therefore, although the phase control has an advantage over the duty control in the steady state, the advantage is relatively small compared with during the preliminary power transmission.

Next, distortion in waveform of the voltage VL1 and the current IL1 and the strength thereof in the power transmitting coil L1 during the preliminary power transmission period are compared between the wireless power transmission systems according to the example and the comparative example.

Figure 15:
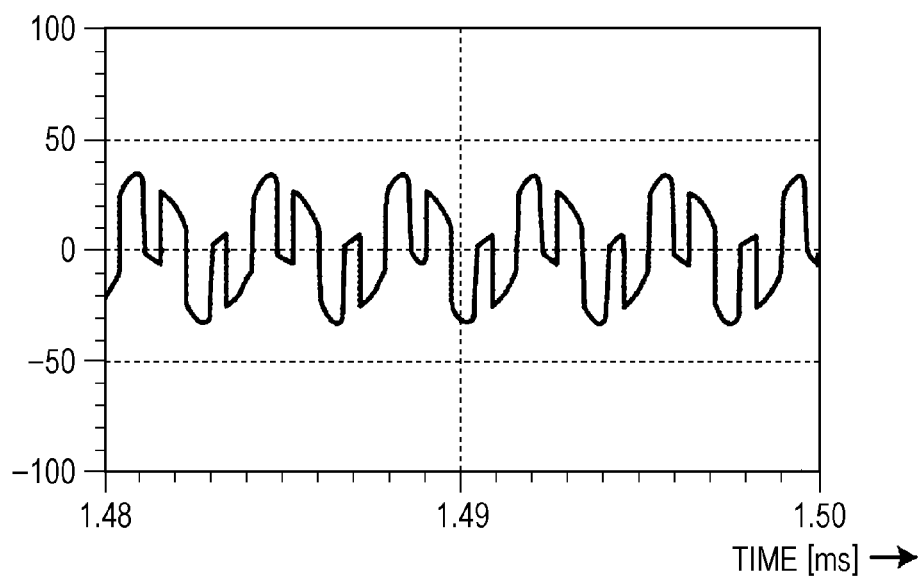
FIG. 15 is a graph showing a waveform of a voltage across a power transmitting coil when a duty ratio is 20% in the comparative example.
Figure 16:
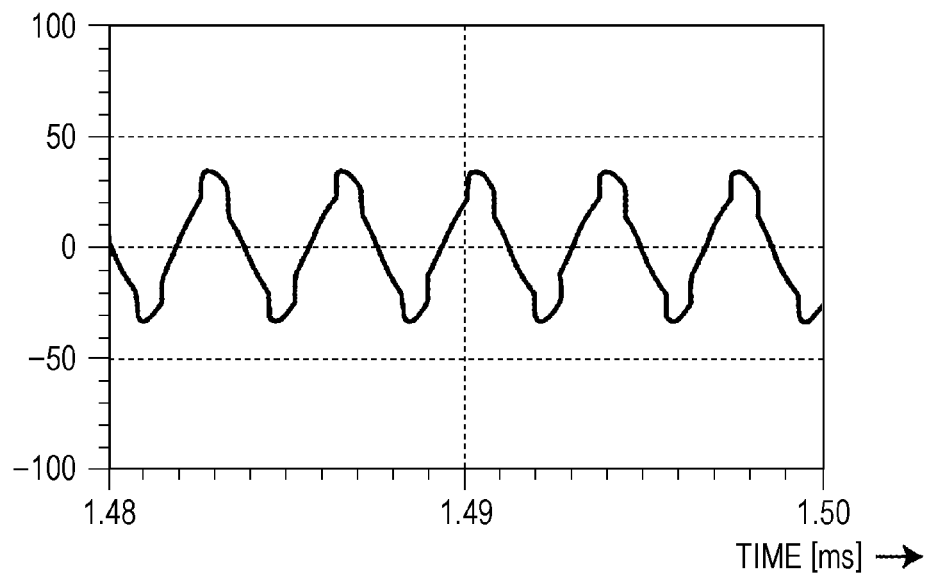
FIG. 16 is a graph showing a waveform of a voltage across a power transmitting coil when a phase shift amount is 108 degrees in the example.
Figure 17:
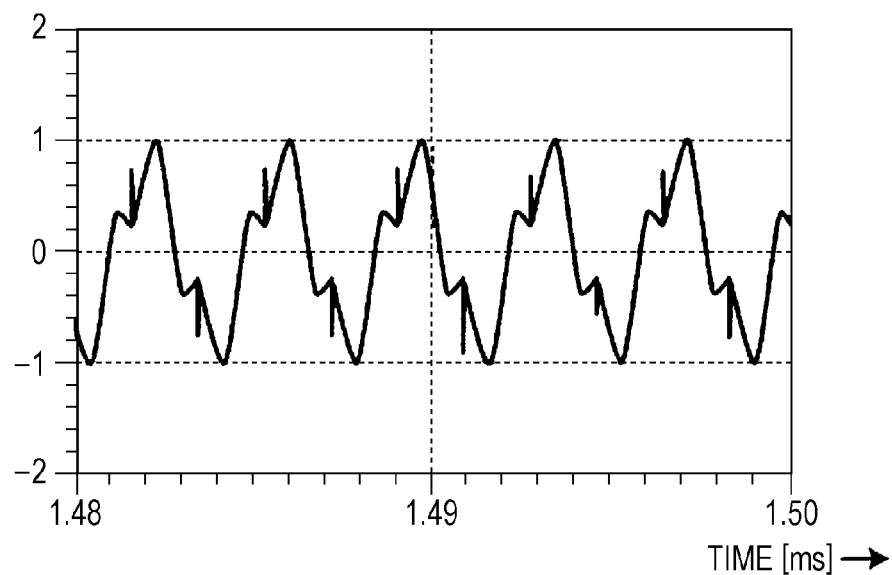
FIG. 17 is a graph showing a waveform of a current in the power transmitting coil when the duty ratio is 20% in the comparative example.
Figure 18:
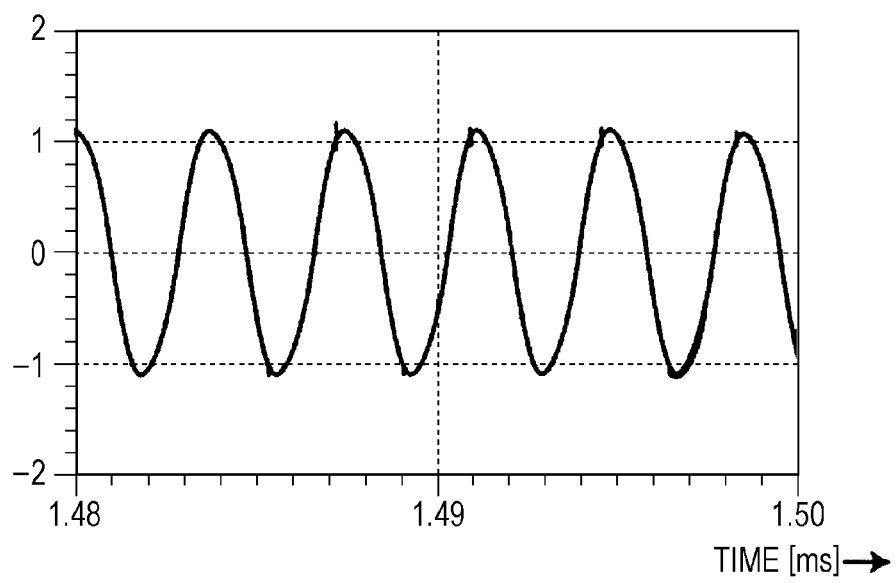
FIG. 18 is a graph showing a waveform of a current in the power transmitting coil when the phase shift amount is 108 degrees in the example.
Figure 19:
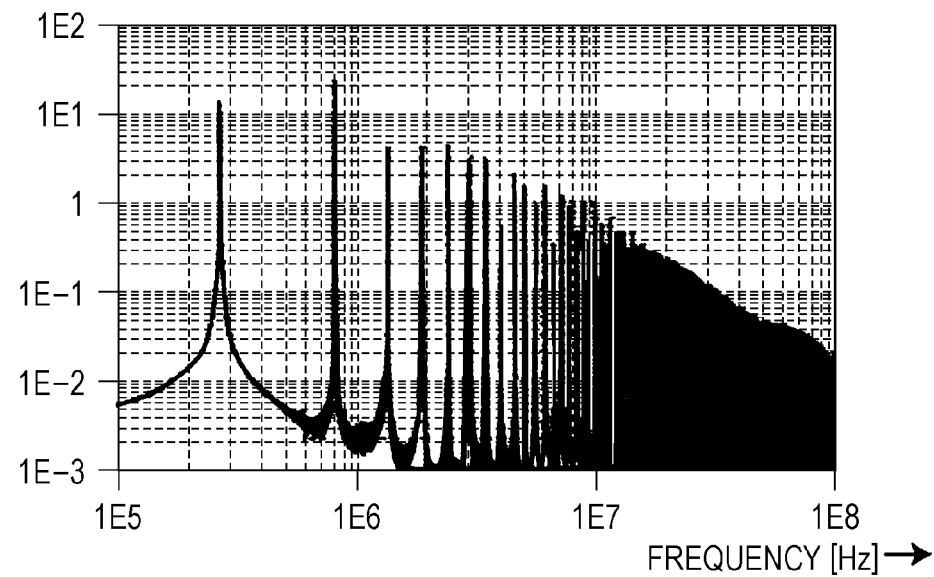
FIG. 19 is a graph showing the fast Fourier transform of the waveform of the voltage across the power transmitting coil when the duty ratio is 20% in the comparative example.
Figure 20:
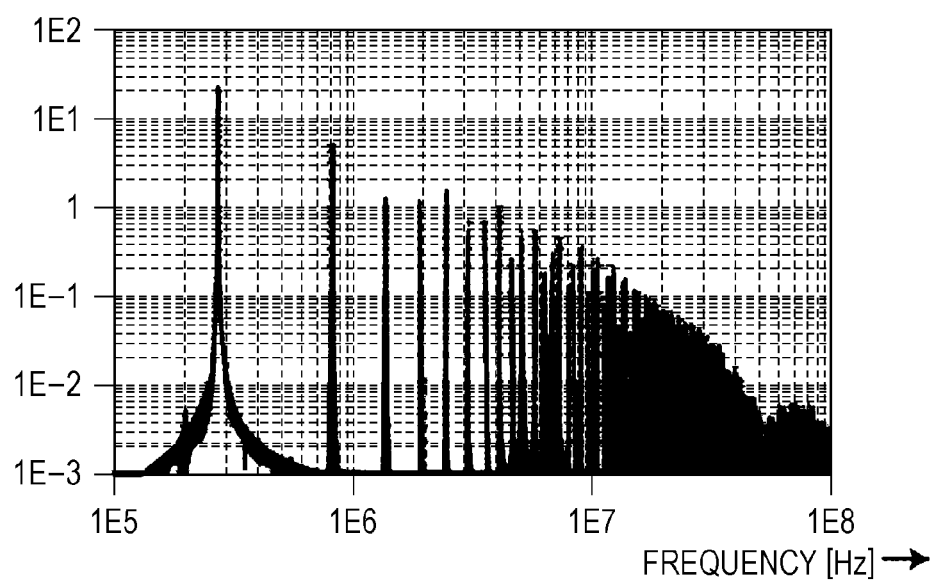
FIG. 20 is a graph showing the fast Fourier transform of the waveform of the voltage across the power transmitting coil when the phase shift amount is 108 degrees in the example.
Figure 21:
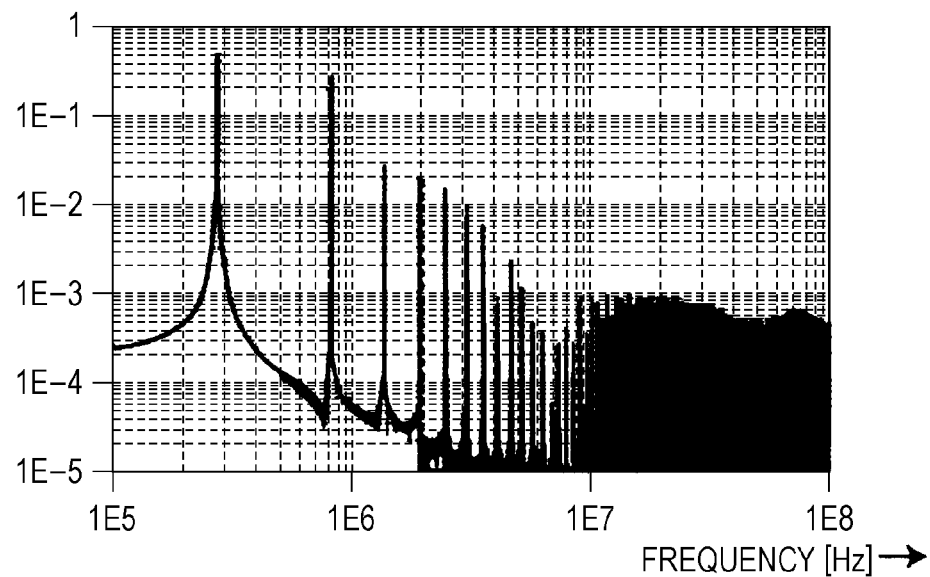
FIG. 21 is a graph showing the fast Fourier transform of the waveform of the current in the power transmitting coil when the duty ratio is 20% in the comparative example.
Figure 22:
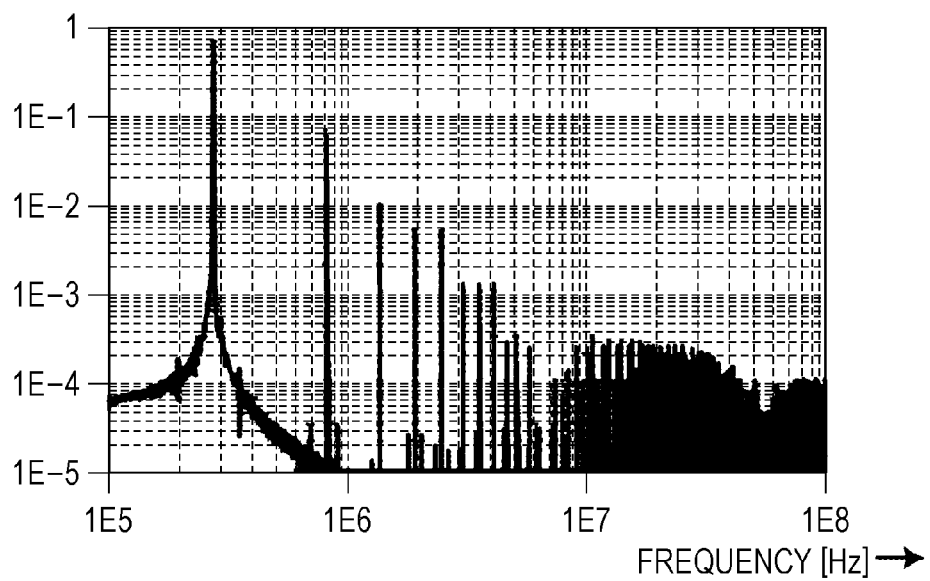
FIG. 22 is a graph showing the fast Fourier transform of the waveform of the current in the power transmitting coil when the phase shift amount is 108 degrees in the example.

FIG. 15 is a graph showing the waveform of the voltage VL1 in the power transmitting coil L1 when the duty ratio is 20% in the comparative example. FIG. 16 is a graph showing the waveform of the voltage VL1 in the power transmitting coil L1 when the phase shift amount φ is 108 degrees in the example. FIG. 17 is a graph showing the waveform of the current IL1 in the power transmitting coil L1 when the duty ratio is 20% in the comparative example. FIG. 18 is a graph showing the waveform of the current IL1 in the power transmitting coil L1 when the phase shift amount φ is 108 degrees in the example. FIG. 19 is a graph showing the fast Fourier transform of the waveform of the voltage VL1 in the power transmitting coil L1 when the duty ratio is 20% in the comparative example. FIG. 20 is a graph showing the fast Fourier transform of the waveform of the voltage VL1 in the power transmitting coil L1 when the phase shift amount φ is 108 degrees in the example. FIG. 21 is a graph showing the fast Fourier transform of the waveform of the current IL1 in the power transmitting coil L1 when the duty ratio is 20% in the comparative example. FIG. 22 is a graph showing the fast Fourier transform of the waveform of the current IL1 in the power transmitting coil L1 when the phase shift amount φ is 108 degrees in the example. Although each of FIGS. 15 to 18 shows only a part of the waveform during the preliminary power transmission period, the waveform shows the same trend as that shown in each of FIGS. 15 to 18 over the entire preliminary power transmission period. Note that, assuming that a state when the condition including the duty ratio of 20% or the phase shift amount φ of 108 degrees is set to achieve the voltage of 30 V is set as an initial state, FIGS. 15 to 18 show the voltage VL1 or the current IL1 during a period of 1.48 ms to 1.50 ms from the initial state.

Referring to the waveform when the duty ratio is 20% (FIGS. 15 and 17), it can be seen that the waveform is distorted and contains a harmonic component. On the other hand, referring to the waveform when the phase shift amount φ is 108 degrees (FIGS. 16 and 18), the waveform does not contain such a harmonic component as that when the duty ratio is 20%. Referring to FIGS. 19 to 22, over a frequency range of 10 MHz to 100 MHz, the strength when the phase shift amount φ is changed is about ten times that when the duty ratio is changed. It can be seen that, in the high frequency region, a risk of emission of high-frequency noise to peripheral devices is higher when the duty ratio is changed.

As described above, the wireless power transmission system 100 shown in FIG. 2 changes the phase shift amount φ of the pulse signal in a transient state (such as the preliminary power transmission period) where the output power of wireless power transmission is significantly changed. Thus, output characteristics of the oscillation circuit 21 are changed, and occurrence of overvoltage and overcurrent in the power transmitting apparatus 2 can be prevented.

Moreover, in the transient state, the wireless power transmission system 100 shown in FIG. 1 changes the output characteristics of the oscillation circuit 21 by changing the phase shift amount φ of the pulse signal. Thus, occurrence of distortion is suppressed in the waveform of the output voltage and output current (the voltage VL1 and the current IL1 in the power transmitting coil L1) in the power transmitting apparatus 2. As a result, emission of high-frequency noise around the power transmitting apparatus 2 can be suppressed.

The present disclosure includes a power transmitting apparatus and a wireless power transmission system described in the following items.

[Item 1]

A power transmitting device comprising:

a power transmitting antenna that transmits AC power wirelessly to the power receiving antenna of a power receiving device;

an oscillator that includes i) a first switching element group connected to a high potential terminal of DC power supply and ii) a second switching element group connected to a low potential terminal of the DC power supply, iii) a first terminal connected to the first switching element group and iv) a second terminal connected to the second switching element groups, and the oscillator converts DC power of the DC power supply into the AC power by using the first and second switching element groups and outputs the AC power to the power transmitting antenna via the first terminal and the second terminal;

a communication circuit that receives signals from the power receiving device; and control circuitry operative to:

supply pulse signals which control the first and second switching element groups to the oscillator;

change a phase shift amount between a first pulse signal and a second pulse signal, the first pulse signal supplied to one of the first and second switching element groups, the second pulse signal supplied to the other one of the first and second switching element groups;

cause the oscillator to change the voltage of the AC power output;

set an initial value of the phase shift amount when a current flowing through the power transmitting antenna exceeds a predetermined value after the power transmitting antenna transmits the AC power to the power receiving antenna;

cause the oscillator to output preliminary AC power of a voltage corresponding to the initial value of the phase shift amount, and to reduce the phase shift amount from the initial value, and to output preliminary AC power of each voltage corresponding to each of the reduced phase shift amounts;

fix the phase shift amount when the communication circuit receives a first response signal indicating an activation of a control circuitry in the power receiving device in order to wait for reception of a second response signal indicating a maximum power set in the power receiving device; and cause the oscillator to output the AC power while maintaining the voltage corresponding to the fixed phase shift amount.

According to the above aspect, an initial value is set as the phase shift amount when the current flowing through the power transmitting antenna exceeds a predetermined value upon reception of the AC power from the power transmitting antenna by the power receiving antenna. The oscillation circuit outputs preliminary AC power of a voltage corresponding to the initial value.

The phase shift amount is reduced at predetermined time intervals from the initial value, and the oscillation circuit outputs preliminary AC power of each voltage corresponding to each of the reduced phase shift amounts.

It is preferable that the phase shift amount is gradually reduced at predetermined time intervals from the initial value, and the oscillation circuit outputs preliminary AC power of each voltage corresponding to each of the gradually reduced phase shift amounts.

Upon receipt of a first response signal indicating the activation of a control circuit in the power receiving apparatus from the power receiving apparatus through the communication circuit, the phase shift amount upon the activation of the control circuit in the power receiving apparatus is fixed to wait for a second response signal to be transmitted from the power receiving apparatus, the second response signal indicating the maximum power that can be supplied to the control circuit in the power receiving apparatus. Then, the AC power is transmitted while maintaining the voltage corresponding to the fixed phase shift amount.

Thus, the phase control to reduce the phase shift amount can eliminate the time when both of a connection between a positive side of the DC power supply connected to the oscillation circuit and a conductor line and a connection between a negative side thereof and a conductor line are not established.

Therefore, in preliminary power transmission with a significant change in power transmission voltage, the magnitude of overvoltage or overcurrent in the phase control can be set smaller than that of overvoltage or overcurrent in duty control. Also, in the preliminary power transmission, a ratio of noise amplitude in the phase control can be reduced to about ⅓ of that in the duty control. Moreover, emission of high-frequency noise around the power transmitting apparatus can be suppressed.

Furthermore, emission of high-frequency noise around the power transmitting apparatus can be prevented.

Here, determination of whether or not alignment between the power transmitting antenna and the power receiving antenna is completed is performed based on whether or not the current flowing through the power transmitting antenna exceeds the predetermined value upon reception of the AC power from the power transmitting antenna by the power receiving antenna. The present disclosure is not limited to the above method, but whether or not the alignment is completed may be determined by measuring a physical amount of the power transmitting antenna and performing calculation based on the measured physical amount. Here, the physical amount means one having an electrical unit about a coil, such as a voltage to be applied to a power transmitting coil, a current flowing through the power transmitting coil, a frequency to be applied to the power transmitting coil, an input impedance value of the power transmitting coil and an input inductance value of the power transmitting coil. The calculation based on the measured physical amount means the case where the determination about the alignment is made using the physical amount itself and the case where the determination is made based on a ratio value, a coupling coefficient, a Q value or the like, which is calculated from the measured physical amount.

[Item 2]

A power transmitting apparatus of item 1, wherein the first response signal includes a signal strength packet specified by the Qi standard of WPC (wireless power consortium).

According to the above aspect, the power transmitting apparatus can operate exchanging information according to the pre-procedure specified by the Qi standard.

[Item 3]

A power transmitting apparatus of item 2, wherein the signal strength packet includes a signal strength value indicating a voltage corresponding to a phase shift amount upon activation of the control circuit in the power receiving apparatus.

According to the above aspect, power transmission can be performed according to the pre-procedure specified by the Qi standard.

[Item 4]

A power transmitting apparatus of one of items 1 to 3, wherein the second response signal includes a configuration packet specified by the Qi standard of WPC (wireless power consortium).

According to the above aspect, power transmission can be performed according to the pre-procedure specified by the Qi standard.

[Item 5]

A power transmitting apparatus of one of items 1 to 4, wherein the control circuit waits for a third response signal indicating a manufacturer ID of the power receiving apparatus to be transmitted from the power receiving apparatus after the second response signal.

According to the above aspect, power transmission can be performed according to the pre-procedure specified by the Qi standard.

[Item 6]

A power transmitting apparatus of item 5, wherein the third response signal includes an identification packet specified by the Qi standard of WPC (wireless power consortium).

According to the above aspect, power transmission can be performed according to the pre-procedure specified by the Qi standard.

[Item 7]

A power transmitting apparatus of one of items 5 and 6, wherein the control circuit waits for a fourth response signal to be transmitted from the power receiving apparatus after the third response signal, the fourth response signal including a control error value indicating a difference value between a required voltage value of the power receiving apparatus and a voltage value of the AC power from the power transmitting antenna.

According to the above aspect, power transmission can be performed according to the pre-procedure specified by the Qi standard.

[Item 8]

A power transmitting apparatus of item 7, wherein the fourth response signal includes a control error packet specified by the Qi standard of WPC (wireless power consortium).

According to the above aspect, power transmission can be performed according to the pre-procedure specified by the Qi standard.

[Item 9]

A power transmitting apparatus of one of items 7 and 8, wherein the control circuit performs control, upon receipt of the fourth response signal, to reduce the difference value, which is indicated by the control error signal included in the fourth response signal, close to zero by changing the voltage of the AC power based on a change in the phase shift amount.

According to the above aspect, the control to reduce the difference value indicated by the control error signal close to zero is performed to enable a power transmission voltage to coincide with a required voltage.

[Item 10]

A power transmitting apparatus of one of items 1 to 9, wherein
the first switching element group includes at least two switching elements, and
the second switching element group includes at least two switching elements.

[Item 11]

A power transmitting apparatus of one of items 1 to 10, wherein the control circuit reduces the phase shift amount from the initial value every time the pulse signal is supplied to the oscillation circuit.

[Item 12]

A wireless power transmission system including:
a power receiving device that includes a power receiving antenna; and
a power transmitting device that includes
a power transmitting antenna that transmits AC power wirelessly to the power receiving antenna of the power receiving device;
an oscillator that includes i) a first switching element group connected to a high potential terminal of DC power supply and ii) a second switching element group connected to a low potential terminal of the DC power supply, iii) a first terminal connected to the first switching element group and iv) a second terminal connected to the second switching element groups, and the oscillator converts DC power of the DC power supply into the AC power by using the first and second switching element groups and outputs the AC power to the power transmitting antenna via the first terminal and the second terminal;

a communication circuit that receives signals from the power receiving device; and control circuitry operative to:

supply pulse signals which control the first and second switching element groups to the oscillator;

change a phase shift amount between a first pulse signal and a second pulse signal, the first pulse signal supplied to one of the first and second switching element groups, the second pulse signal supplied to the other one of the first and second switching element groups;

change the voltage of the AC power output from the oscillator;

set an initial value of the phase shift amount when a current flowing through the power transmitting antenna exceeds a predetermined value after the power transmitting antenna transmits the AC power to the power receiving antenna;

cause the oscillator to output preliminary AC power of a voltage corresponding to the initial value, and to reduce the phase shift amount from the initial value, and to output preliminary AC power of each voltage corresponding to each of the reduced phase shift amounts;

fix the phase shift amount when the communication circuit receives a first response signal indicating an activation of a control circuitry in the power receiving device in order to wait for reception of a second response signal indicating a maximum power set in the power receiving device; and cause the oscillator to output the AC power while maintaining the voltage corresponding to the fixed phase shift amount.

[Item 13]

A power comprising:

a power transmitting antenna that transmits the AC power wirelessly to the power receiving antenna of a power receiving device;

an oscillator that includes i) a first switching element group connected to a high potential terminal of DC power supply and ii) a second switching element group connected to a low potential terminal of the DC power supply, iii) a first terminal connected to the first switching element group and iv) a second terminal connected to the second switching element groups, and that converts DC power of the DC power supply into the AC power by using the first and second switching element group, and the oscillator converts DC power of the DC power supply into the AC power by using the first and second switching element groups and outputs the AC power to the power transmitting antenna via the first terminal and the second terminal;

a communication circuit that receives signals from the power receiving device; and control circuitry operative to:

supply to the oscillator pulse signals which control the first and second switching element groups;

change a phase shift amount between a first pulse signal and a second pulse signal, the first pulse signal supplied to one of the first and second switching element groups, the second pulse signal supplied to the other one of the first and second switching element groups;

change the voltage of the AC power output from the oscillator;

set an initial value of the phase shift amount when a current flowing through the power transmitting antenna exceeds a predetermined value after the power transmitting antenna transmits the AC power to the power receiving antenna;

cause the oscillator to output preliminary AC power of a voltage corresponding to the initial value, and reduce the phase shift amount from the initial value, and output preliminary AC power of each voltage corresponding to each of the reduced phase shift amounts;

fix the phase shift amount when the communication circuit receives a first response signal indicating an activation of a control circuitry in the power receiving device in order to wait for reception of a second response signal including control information used for the transmission of the AC power; and cause the oscillator to output the AC power while maintaining the voltage corresponding to the fixed phase shift amount.

[Item 14]

A power transmitting apparatus of item 13, wherein the first switching element group includes at least two switching elements, and the second switching element group includes at least two switching elements.

[Item 15]

A wireless power transmitting apparatus in a wireless power transmission system for transmitting power from the wireless power transmitting apparatus to a wireless power receiving apparatus, wherein the wireless power receiving apparatus includes a power receiving antenna including a resonance circuit with a power receiving coil, and the wireless power transmitting apparatus includes a power transmitting antenna which includes a resonance circuit with a power transmitting coil, and is electromagnetically coupled to the power receiving antenna in the wireless power receiving apparatus, a pulse generation circuit which generates a plurality of pulse signals having a predetermined duty ratio and having variable phases different from each other, an oscillation circuit which includes a plurality of switching elements, which are opened and closed according to the plurality of pulse signals, converts DC input power into AC output power, and supplies the AC output power to the power transmitting antenna, and a control circuit which controls the phase of each of the pulse signals, wherein the plurality of switching elements include at least a pair of switching elements which supply a positive or negative output voltage to the power transmitting antenna when turned on at the same time, and the control circuit gradually changes a phase shift amount of the pulse signal applied to one of the pair of switching elements with respect to the pulse signal applied to the other one of the pair of switching elements, when increasing the output power of the oscillation circuit from a value during the stop of power transmission to a value during the power transmission.

[Item 16]

A wireless power transmitting apparatus of item 15, wherein the control circuit gradually increases the output power of the oscillation circuit by gradually reducing, from a predetermined initial value, the phase shift amount of the pulse signal applied to one of the pair of switching elements with respect to the pulse signal applied to the other one of the pair of switching elements.

[Item 17]

A wireless power transmitting apparatus of one of items 15 and 16, wherein the control circuit changes the phase shift amount of each of the pulse signals after every elapse of a predetermined time period.

[Item 18]

A wireless power transmitting apparatus of one of items 15 and 16, further including:

a monitor circuit which detects at least one of a voltage and a current in the oscillation circuit, wherein the control circuit further changes the phase shift amount of each of the pulse signals after waiting for a change in peak of the voltage or current in the oscillation circuit to be within a predetermined range, when changing the phase shift amount of each of the pulse signals.

[Item 19]

A wireless power transmitting apparatus of item 18, wherein the control circuit determines a step width to change the phase shift amount, based on the magnitude of the voltage or current in the oscillation circuit.

[Item 20]

A wireless power transmitting apparatus of one of items 15 to 19, wherein the plurality of switching elements include first and second switching elements, which are series-connected to each other, and third and fourth switching elements, which are series-connected to each other, a positive output voltage is supplied to the power transmitting antenna when the first and fourth switching elements are turned on at the same time, and a negative output voltage is supplied to the power transmitting antenna when the second and third switching elements are turned on at the same time, and the control circuit controls the phase of each of the pulse signals so as to turn on the third or fourth switching element when the first and second switching elements are turned off at the same time, and to turn on the first or second switching element when the third and fourth switching elements are turned off at the same time.

[Item 21]

A wireless power transmission system including:

a wireless power transmitting apparatus of one of items 15 to 20; and a wireless power receiving apparatus provided with a power receiving antenna including a resonance circuit with a power receiving coil.

A wireless power transmitting apparatus and a wireless power transmission system according to the present disclosure are useful for electronic devices such as a smartphone, a tablet terminal device and a portable terminal device, and motor-driven machines such as an electric vehicle.

What is claimed is:

1. A control method of a power transmitting device, the power transmitting device including a power transmitting antenna that transmits AC power wirelessly to the power receiving antenna of a power receiving device; an oscillator that includes (i) a first switching element group connected to a high potential terminal of DC power supply, (ii) a second switching element group connected to a low potential terminal of the DC power supply, (iii) a first terminal connected to the first switching element group, and (iv) a second terminal connected to the second switching element groups, wherein the oscillator converts DC power of the DC power supply into the AC power, by using the first and second switching element groups, and outputs the AC power to the power transmitting antenna via the first terminal and the second terminal; and a communication circuit that receives signals from the power receiving device, the method comprising:

supplying pulse signals that control the first and second switching element groups to the oscillator;

changing a phase shift amount between a first pulse signal and a second pulse signal, the first pulse signal supplied to one of the first and second switching element groups, and the second pulse signal supplied to the other one of the first and second switching element groups;

causing the oscillator to change the voltage of the AC power output;

setting an initial value of the phase shift amount when a current flowing through the power transmitting antenna exceeds a predetermined value after the power transmitting antenna transmits the AC power to the power receiving antenna;

causing the oscillator to output preliminary AC power of a voltage corresponding to the initial value of the phase shift amount, to reduce the phase shift amount from the initial value, and to output preliminary AC power of each voltage corresponding to each of the reduced phase shift amounts;

fixing the phase shift amount when the communication circuit receives a first response signal indicating an activation of a control circuitry in the power receiving device in order to wait for reception of a second response signal indicating a maximum power set in the power receiving device; and causing the oscillator to output the AC power while maintaining the voltage corresponding to the fixed phase shift amount.

2. The control method of the power transmitting device according to claim 1, wherein the first response signal includes a signal strength packet specified by the Qi standard of WPC (wireless power consortium).

3. The control method of the power transmitting device according to claim 2, wherein the signal strength packet includes a signal strength value indicating a voltage corresponding to a phase shift amount upon activation of the control circuitry in the power receiving device.

4. The control method of the power transmitting device according to claim 1, wherein the second response signal includes a configuration packet specified by the Qi standard of WPC (wireless power consortium).

5. The control method of the power transmitting device according to claim 1, further comprising:

waiting for a third response signal indicating a manufacturer ID of the power receiving device to be transmitted from the power receiving device after the second response signal.

6. The control method of the power transmitting device according to claim 5, wherein the third response signal includes an identification packet specified by the Qi standard of WPC (wireless power consortium).

7. The control method of the power transmitting device according to claim 5, further comprising:

waiting for a fourth response signal to be transmitted from the power receiving device after the third response signal, the fourth response signal including a control error value indicating a difference value between a required voltage value of the power receiving device and a voltage value of the AC power from the power transmitting antenna.

8. The control method of the power transmitting device according to claim 7, wherein the fourth response signal includes a control error packet specified by the Qi standard of WPC (wireless power consortium).

9. The control method of the power transmitting device according to claim 7, further comprising:
upon receipt of the fourth response signal, reducing the difference value, which is indicated by the control error signal included in the fourth response signal, close to zero by changing the voltage of the AC power based on a change in the phase shift amount.

* * * * *